US010426128B2

(12) United States Patent
Balkenhol et al.

(10) Patent No.: US 10,426,128 B2
(45) Date of Patent: *Oct. 1, 2019

(54) SAFETY VALVE DEVICE

(71) Applicant: GEA Farm Technologies GmbH, Bönen (DE)

(72) Inventors: Reinhard Balkenhol, Paderborn (DE); Jake Kallenbach, La Crosse, WI (US); Matthew J. Stuessel, Alma Center, WI (US); Kevin L. Torgerson, Holmen, WI (US)

(73) Assignee: GEA Farm Technologies GmbH, Bönen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/387,266

(22) Filed: Dec. 21, 2016

(65) Prior Publication Data

US 2017/0164576 A1 Jun. 15, 2017

Related U.S. Application Data

(63) Continuation of application No. 14/135,798, filed on Dec. 20, 2013, now Pat. No. 9,526,224.

(51) Int. Cl.
*A01J 7/00* (2006.01)
*A01J 5/04* (2006.01)
(Continued)

(52) U.S. Cl.
CPC . *A01J 7/00* (2013.01); *A01J 5/04* (2013.01); *A01J 5/044* (2013.01); *F16K 11/04* (2013.01);
(Continued)

(58) Field of Classification Search
CPC ... A01J 7/00; A01J 5/044; F16K 11/04; F16L 55/07
See application file for complete search history.

(56) References Cited

U.S. PATENT DOCUMENTS 1,365,665 A 1/1921 Davies
2,012,031 A 8/1935 Woodruff
(Continued)

FOREIGN PATENT DOCUMENTS

AU 641229 9/1993
AU 2013294747 B2 11/2016
(Continued)

OTHER PUBLICATIONS

"Grade A pasteurized milk ordinance" 2003 Revision; US Department Health and Human Services, Public Health Service; Food and Drug Administration.
(Continued)

*Primary Examiner* — Craig M Schneider
*Assistant Examiner* — Kevin R Barss
(74) *Attorney, Agent, or Firm* — Smith Law Office; Jeffry W. Smith

(57) ABSTRACT

A safety valve device for a milking installation for milking milk-producing animals having a first valve with a first port and with a first port connector, a second valve with a second port and with a second port connector, a third valve with a third port and a third port connector, a drive, a common actuator, and at least one valve spring, and arranged so that the first port connector of the first valve is in fluid communication with the second port connector of the second valve, and the safety valve device can be moved between a first switching position, in which the first valve and the second valve are closed in order to block the first port and the second port and the third valve, is open a transition position, in which the first valve, the second valve and the third valve are closed, and a second switching position, in which the first valve and the second valve are open to connect the first port to the second port and the third valve is closed to block the third port.

15 Claims, 24 Drawing Sheets

(51) Int. Cl.
*F16K 11/04* (2006.01)
*F16L 55/07* (2006.01)
(52) U.S. Cl.
CPC ....... *F16L 55/07* (2013.01); *Y10T 137/87708* (2015.04)

(56) References Cited

U.S. PATENT DOCUMENTS

| | | |
|---|---|---|
| 2,532,088 A | 11/1950 | Cordis |
| 2,747,544 A | 5/1956 | Thomas |
| 3,014,455 A | 12/1961 | Olander |
| 3,099,246 A | 7/1963 | Beskow |
| 3,119,401 A | 1/1964 | Merritt et al. |
| 3,417,763 A | 12/1968 | Fjermestad et al. |
| 3,461,845 A | 8/1969 | Peterson |
| 3,474,760 A | 10/1969 | Siddall et al. |
| 3,482,547 A | 12/1969 | Maier |
| 3,500,839 A | 3/1970 | Bender |
| 3,630,081 A | 12/1971 | Nelson |
| 3,648,696 A | 3/1972 | Keith |
| 3,688,783 A | 9/1972 | Owens |
| 3,696,790 A | 10/1972 | Albright |
| 3,713,423 A | 1/1973 | Sparr, Sr. |
| 3,726,253 A | 4/1973 | Duncan |
| 3,762,371 A | 10/1973 | Quayle et al. |
| 3,789,798 A | 2/1974 | Reisgies et al. |
| 3,797,525 A | 3/1974 | Lieser |
| 3,861,335 A | 1/1975 | Przewalski |
| 3,861,355 A | 1/1975 | Johnson et al. |
| 3,957,018 A | 5/1976 | Barrett |
| 3,971,512 A | 7/1976 | Duncan |
| 3,973,520 A | 8/1976 | Flocchini |
| 4,034,714 A | 7/1977 | Umbaugh et al. |
| 4,061,504 A | 12/1977 | Zall et al. |
| 4,149,489 A | 4/1979 | Umbaugh et al. |
| 4,168,677 A | 9/1979 | Brown |
| 4,175,514 A | 11/1979 | Souza et al. |
| 4,177,760 A | 12/1979 | Slater |
| 4,222,346 A | 9/1980 | Reisgies |
| 4,253,421 A | 3/1981 | Slater et al. |
| 4,295,490 A | 10/1981 | Boudreau |
| 4,305,346 A | 12/1981 | Sparr, Sr. |
| 4,332,215 A | 6/1982 | Larson |
| 4,333,387 A | 6/1982 | Seitz |
| 4,333,421 A | 6/1982 | Schluckbier |
| 4,344,385 A | 8/1982 | Swanson et al. |
| 4,372,345 A | 2/1983 | Mehus |
| 4,378,757 A | 4/1983 | Hamann |
| 4,393,811 A | 7/1983 | Bodmin |
| 4,395,971 A | 8/1983 | Happel et al. |
| 4,403,568 A | 9/1983 | Fukuhara et al. |
| 4,403,569 A | 9/1983 | Bennett |
| 4,459,938 A | 7/1984 | Noorlander |
| 4,462,425 A | 7/1984 | Mehus |
| 4,485,762 A | 12/1984 | Sutton et al. |
| 4,498,419 A | 2/1985 | Flocchini |
| 4,516,530 A | 5/1985 | Reisgies et al. |
| 4,572,105 A | 2/1986 | Chowdhury et al. |
| 4,586,462 A | 5/1986 | Icking |
| 4,593,649 A | 6/1986 | Britten |
| 4,903,639 A | 2/1990 | Kessel |
| 4,907,535 A | 3/1990 | Matsuzawa et al. |
| 4,924,809 A | 5/1990 | Verbrugge |
| 4,936,254 A | 6/1990 | Marshall |
| 5,052,341 A | 10/1991 | Woolford et al. |
| 5,101,770 A | 4/1992 | Stevenson |
| 5,134,967 A | 8/1992 | Marshall |
| 5,161,482 A | 11/1992 | Griffin |
| 5,166,313 A | 11/1992 | Archibald et al. |
| 5,167,201 A | 12/1992 | Peles |
| 5,178,095 A | 1/1993 | Mein |
| 5,218,924 A | 6/1993 | Thompson et al. |
| 5,255,628 A | 10/1993 | Kristoffer |
| 5,379,722 A | 1/1995 | Larson |
| 5,386,799 A | 2/1995 | Dietrich |
| 5,390,627 A | 2/1995 | Van Der Berg et al. |
| 5,403,005 A | 4/1995 | Avila-Valdez |
| 5,493,995 A | 2/1996 | Chowdhury |
| 5,568,788 A | 10/1996 | Van Den Berg et al. |
| 5,572,947 A | 11/1996 | Larson et al. |
| 5,673,650 A | 10/1997 | Mottram et al. |
| 5,697,325 A | 12/1997 | Gehm et al. |
| 5,722,343 A | 3/1998 | Aurik et al. |
| 5,769,025 A | 6/1998 | Van Der Lely et al. |
| 5,778,820 A | 7/1998 | Van Der Lely et al. |
| 5,850,845 A | 12/1998 | Pereira et al. |
| 5,881,669 A | 3/1999 | Van Den Berg et al. |
| 5,896,828 A | 4/1999 | Kronschnabel et al. |
| 5,909,716 A | 6/1999 | Van Der Lely |
| 5,934,220 A | 8/1999 | Hall et al. |
| 5,957,081 A | 9/1999 | Van Der Lely et al. |
| 5,960,736 A | 10/1999 | Ludington et al. |
| 5,992,347 A | 11/1999 | Innings et al. |
| 6,009,833 A | 1/2000 | Van Der Lely |
| 6,079,359 A | 6/2000 | Van Den Berg |
| 6,089,242 A | 7/2000 | Buck |
| 6,098,570 A | 8/2000 | Aurik et al. |
| 6,202,593 B1 | 3/2001 | Maier et al. |
| 6,234,110 B1 | 5/2001 | Xavier |
| 6,244,215 B1 | 6/2001 | Oosterling |
| 6,267,077 B1 | 7/2001 | Van Den Berg et al. |
| 6,276,297 B1 | 8/2001 | Van Den Berg et al. |
| 6,308,655 B1 | 10/2001 | Oosterling |
| 6,318,299 B1 | 11/2001 | Birk |
| 6,321,682 B1 | 11/2001 | Eriksson et al. |
| 6,367,416 B1 | 4/2002 | Van Der Lely |
| 6,371,046 B1 | 4/2002 | Petterson et al. |
| 6,435,132 B1 | 8/2002 | Milbrath et al. |
| 6,546,893 B1 | 4/2003 | Happel et al. |
| 6,550,420 B1 | 4/2003 | Bjork |
| 6,561,126 B2 | 5/2003 | Forsen et al. |
| 6,584,930 B2 | 7/2003 | Buecker |
| 6,591,784 B1 | 7/2003 | Eriksson |
| 6,598,560 B1 | 7/2003 | Van Den Berg |
| 6,619,227 B1 | 9/2003 | Berger et al. |
| 6,626,130 B1 | 9/2003 | Eriksson |
| 6,644,240 B1 | 11/2003 | Dietrich |
| 6,752,102 B2 | 6/2004 | Dahl et al. |
| 6,755,153 B1 | 6/2004 | Chowdhury |
| 6,935,270 B2 | 8/2005 | Wipperfurth et al. |
| 6,997,136 B1 | 2/2006 | Coates |
| 7,036,981 B2 | 5/2006 | Veenstra et al. |
| 7,128,020 B2 | 10/2006 | Björk et al. |
| 7,143,718 B2 | 12/2006 | Bosma et al. |
| 7,162,970 B2 | 1/2007 | Maier, Jr. |
| 7,174,848 B2 | 2/2007 | Brown et al. |
| 7,178,480 B2 | 2/2007 | Dahl et al. |
| 7,237,694 B2 | 7/2007 | Freudinger |
| 7,263,948 B2 | 9/2007 | Ericsson et al. |
| 7,281,493 B2 | 10/2007 | Dietrich |
| 7,290,497 B2 | 11/2007 | Rottier et al. |
| 7,350,478 B2 | 4/2008 | Fernandez |
| 7,377,232 B2 | 5/2008 | Holmgren et al. |
| 7,401,573 B2 | 7/2008 | Torgerson |
| 7,412,943 B2 | 8/2008 | Ericsson et al. |
| 7,484,474 B2 | 2/2009 | Van Den Berg et al. |
| 7,536,975 B2 | 5/2009 | Denes et al. |
| 7,575,022 B2 | 8/2009 | Higgins |
| 7,578,260 B2 | 8/2009 | Shin |
| 7,707,966 B2 | 5/2010 | Torgerson et al. |
| 7,765,951 B2 | 8/2010 | Dietrich |
| 7,793,614 B2 | 9/2010 | Ericsson et al. |
| 7,926,449 B2 | 4/2011 | Stellnert et al. |
| 7,963,249 B2 | 6/2011 | Duke |
| 8,025,029 B2 | 9/2011 | Torgerson et al. |
| 8,033,247 B2 | 10/2011 | Torgerson et al. |
| 8,117,989 B2 | 2/2012 | Torgerson et al. |
| 8,210,123 B2 | 7/2012 | Duke |
| 8,240,272 B2 | 8/2012 | Duke |
| 8,342,125 B2 | 1/2013 | Torgerson et al. |
| 8,590,486 B2 | 11/2013 | Torgerson et al. |
| 8,677,937 B2 | 3/2014 | Shin |
| 8,770,146 B2 | 7/2014 | Buck et al. |
| 8,925,483 B2 | 1/2015 | Torgerson et al. |

(56) References Cited

U.S. PATENT DOCUMENTS

| | | | |
|---|---|---|---|
| 9,016,238 | B2 | 4/2015 | Duke |
| 9,049,835 | B2 | 6/2015 | Duke |
| 9,468,190 | B2 | 10/2016 | Duke |
| 9,526,224 | B2 * | 12/2016 | Balkenhol .................. A01J 7/00 |
| 9,686,958 | B2 | 6/2017 | Sellner et al. |
| 2002/0185071 | A1 | 12/2002 | Guo |
| 2004/0089242 | A1 | 5/2004 | Verstege et al. |
| 2004/0231603 | A1 | 11/2004 | Bjork et al. |
| 2005/0274327 | A1 | 12/2005 | Johnsson et al. |
| 2006/0016399 | A1 | 1/2006 | Torgerson |
| 2006/0037542 | A1 | 2/2006 | Denes et al. |
| 2006/0112887 | A1 | 6/2006 | Brown et al. |
| 2007/0070803 | A1 | 3/2007 | Urquhart |
| 2007/0157887 | A1 | 7/2007 | Fernandez |
| 2007/0186860 | A1 | 8/2007 | Dietrich |
| 2007/0215053 | A1 | 9/2007 | Duke |
| 2007/0277737 | A1 | 12/2007 | Maier et al. |
| 2008/0022932 | A1 | 1/2008 | Rottier et al. |
| 2008/0202433 | A1 | 8/2008 | Duke |
| 2008/0276871 | A1 | 11/2008 | Auburger et al. |
| 2008/0314322 | A1 | 12/2008 | Stellnert et al. |
| 2009/0050061 | A1 | 2/2009 | Duke |
| 2009/0050062 | A1 | 2/2009 | Auburger et al. |
| 2009/0064937 | A1 | 3/2009 | Rottier et al. |
| 2009/0151641 | A1 | 6/2009 | Schulze Wartenhorst et al. |
| 2009/0165724 | A1 | 7/2009 | Mader et al. |
| 2009/0320760 | A1 | 12/2009 | Torgerson et al. |
| 2010/0132626 | A1 | 6/2010 | Torgerson et al. |
| 2010/0154900 | A1 | 6/2010 | Torgerson et al. |
| 2010/0236487 | A1 | 9/2010 | Stellnert et al. |
| 2010/0326360 | A1 | 12/2010 | Duke et al. |
| 2011/0220028 | A1 | 9/2011 | Duke |
| 2011/0220160 | A1 | 9/2011 | Bosma |
| 2011/0232575 | A1 | 9/2011 | Duke |
| 2012/0111275 | A1 | 5/2012 | Torgerson et al. |
| 2012/0118237 | A1 | 5/2012 | Torgerson et al. |
| 2012/0118238 | A1 | 5/2012 | Torgerson et al. |
| 2012/0272911 | A1 | 11/2012 | Duke |
| 2013/0199449 | A1 | 8/2013 | Daniel |
| 2014/0283751 | A1 | 9/2014 | Buck et al. |
| 2015/0201577 | A1 | 7/2015 | Duke |
| 2015/0260302 | A1 | 9/2015 | Peterson et al. |
| 2016/0319947 | A1 | 11/2016 | Balkenhol |
| 2017/0014837 | A1 | 1/2017 | Duke |
| 2017/0359995 | A1 | 12/2017 | Sellner et al. |
| 2018/0064056 | A1 | 3/2018 | Torgerson et al. |
| 2018/0220616 | A1 | 8/2018 | Torgerson et al. |
| 2018/0235173 | A1 | 8/2018 | Torgerson et al. |

FOREIGN PATENT DOCUMENTS

| | | |
|---|---|---|
| AU | 2015227478 B2 | 6/2018 |
| DE | 1582939 | 7/1970 |
| DE | 2622794 | 12/1977 |
| DE | 3540058 | 5/1987 |
| DE | 261300 | 10/1988 |
| DE | 4006785 | 9/1990 |
| DE | 10160161 A1 | 6/2003 |
| EP | 0277396 A1 | 8/1988 |
| EP | 0313109 A1 | 4/1989 |
| EP | 0319523 A2 | 6/1989 |
| EP | 0332235 A2 | 9/1989 |
| EP | 0459817 A1 | 12/1991 |
| EP | 0479397 A2 | 4/1992 |
| EP | 0527509 A2 | 2/1993 |
| EP | 0543463 A1 | 5/1993 |
| EP | 0630557 A2 | 12/1994 |
| EP | 0728412 A1 | 8/1996 |
| EP | 0801893 A2 | 10/1997 |
| EP | 0945057 A1 | 9/1999 |
| EP | 1219167 A2 | 7/2002 |
| EP | 1222853 A2 | 7/2002 |
| EP | 1089615 B1 | 3/2003 |
| EP | 1520469 A1 | 4/2005 |
| EP | 1543720 A1 | 6/2005 |
| EP | 1790217 A2 | 5/2007 |
| EP | 1795069 A1 | 6/2007 |
| EP | 1679956 B1 | 12/2008 |
| EP | 2113169 A1 | 11/2009 |
| EP | 1933616 B1 | 1/2011 |
| EP | 2277373 A2 | 1/2011 |
| EP | 1737291 B1 | 11/2013 |
| GB | 918766 | 2/1963 |
| GB | 1160900 | 8/1969 |
| GB | 1440901 | 6/1976 |
| GB | 0324647.7 | 10/2003 |
| GB | 0402119.2 | 1/2004 |
| GB | 0408968.6 | 4/2004 |
| GB | 0417392.8 | 4/2004 |
| JP | 2002-345955 | 12/2002 |
| JP | 2002354958 | 12/2002 |
| JP | 2005-192404 | 7/2005 |
| NL | 1016237 | 3/2002 |
| NL | 1021950 C | 5/2004 |
| SU | 1676538 | 9/1991 |
| WO | 1993/13651 | 7/1993 |
| WO | 1998/28969 | 7/1998 |
| WO | 1999/27775 | 6/1999 |
| WO | 1999/46978 | 9/1999 |
| WO | 1999/66767 | 12/1999 |
| WO | 1999/66787 | 12/1999 |
| WO | 01/17337 | 3/2001 |
| WO | 01/17338 | 3/2001 |
| WO | 02/07506 | 1/2002 |
| WO | 02/23976 | 3/2002 |
| WO | 03/030630 | 4/2003 |
| WO | 03/077645 | 9/2003 |
| WO | 03/098998 | 12/2003 |
| WO | 04/032608 | 4/2004 |
| WO | 2004/030445 A2 | 4/2004 |
| WO | 05/022986 | 3/2005 |
| WO | 05/043986 | 5/2005 |
| WO | 05/072516 | 8/2005 |
| WO | 05/102035 | 11/2005 |
| WO | 2006/029797 | 3/2006 |
| WO | 2006/110079 | 10/2006 |
| WO | 2006/117019 | 11/2006 |
| WO | 2006/135917 | 12/2006 |
| WO | 2007/31783 | 3/2007 |
| WO | 2007/129884 | 11/2007 |
| WO | 2007/129888 | 11/2007 |
| WO | 2008/102567 | 8/2008 |
| WO | 2008/138862 | 11/2008 |
| WO | 2009/077607 | 6/2009 |
| WO | 2009/158000 | 12/2009 |
| WO | 2010/053577 | 5/2010 |
| WO | 2011/28292 | 3/2011 |
| WO | 2011/28293 | 3/2011 |
| WO | 2011/28294 | 3/2011 |
| WO | 2011102911 | 8/2011 |
| WO | 2014/016588 | 1/2014 |
| WO | 2015/118336 | 8/2015 |
| WO | 2015/145116 | 10/2015 |
| WO | 2015/150807 | 10/2015 |

OTHER PUBLICATIONS

"3-A® Accepted Practices for Permanently Installed Product and Solution Pipelines and Cleaning Systems Used in Milk and Milk Product Processing Plants, No. 605-04," Section N; Aug. 20, 1994.

Akam, D.N., "The Development of Equipment for the Mechanization of Manual Operations in Milking Machine," 17th Annual Meeting, National Mastitis Counsel, Inc., Feb. 21-23, 1978, pp. 417-426.

Grindal; et al., "Automatic application of teat disinfectant through the milking machine cluster" Journal of Dairy Research, 56:579-585 (1989).

International Search Report and Written Opinion from PCT/US2011/00322, dated Dec. 20, 2011.

Letter to Alex Ferguson from Jeffry W. Smith dated Dec. 22, 2006, 2pp.

Neijenhuis; et al., "Health of dairy cows milked by an automatic

(56) References Cited

OTHER PUBLICATIONS milking system; Effects of milking interval on teat condition and milking performance with whole-udder take off", Oct. 2003, 23 pages.
Office Action for U.S. Appl. No. 10/576,744 dated Jun. 3, 2010, 8pp.
Office Action for U.S. Appl. No. 11/652,372 dated Feb. 11, 2008, 14pp.
Office Action for U.S. Appl. No. 11/662,454 dated Aug. 16, 2010, 20pp.
Office Action for U.S. Appl. No. 11/904,769 dated Feb. 20, 2008, 9pp.
Office Action for U.S. Appl. No. 12/712,787 dated Jun. 27, 2011.
PCT/GB04/004343—Written Opinion of ISA & IPRP, 5pp.
PCT/US06/023075—ISR & Written Opinion.
PCT/US09/006026—IPRP, Written Opinion of ISA & ISR, 9pp.
PCT/US09/03770—IPRP and Written Opinion, and ISR.
Preliminary Amendment for U.S. Appl. No. 10/576,744, filed Apr. 21, 2006, 16pp.
Preliminary Amendment for U.S. Appl. No. 10/576,744, filed Aug. 7, 2008, 10 pp.
Shearn; et al., "Reduction of bacterial contamination of teatcup liners by an entrained wash system," Veterinary Record (1994), 134, 450, 1p.
Thompson; et al. "The End-Of-Milking Sequence and its Mechanization" 1976 Winter Mtg., Dec. 14-17, 1976, Animal Physiology and Genetics Inst., Beltsville, MD, 15pp.
U.S. Appl. No. 60/566,313, filed Apr. 29, 2004, J.R.J. Duke.
U.S. Appl. No. 60/566,314, filed Apr. 29, 2004, J.R.J. Duke.
U.S. Appl. No. 60/578,997, filed Jun. 12, 2004, Kevin L. Torgerson.
Notice of Opposition and Opposition brief for EP Patent 1737291, Filed on Aug. 26, 2014 by GEA Farm Technologies GmbH, 74 pages.
Response filed Feb. 2, 2015 by an Udder IP Company in the Opposition of EP Patent 1737291, 53 pages.
European Search Report dated Sep. 24, 2015 for EP Application No. 15171008.4, 6 pages.
Reply filed on Dec. 16, 2015 by GEA Farm Technologies GmbH in the Opposition of EP Patent No. 1737291, 75 pages.
Wildbrett; et al., "Über Reinigung und Desinfektion von Tanks" Materials and Corrosion 12(12):759-764. Nov. 1961.
European Patent Office Preliminary Opinion and Summons to Attend Oral Proceedings dated Jan. 18, 2016, Opposition of EP Patent 1737291, 12 pages.
European Search Report dated Aug. 13, 2014, EP Application No. 14159588.4, 5 pages.
International Search Report and Written Opinion from PCT/EP2014/077684, dated Apr. 10, 2015, 10 pages.
Amendments and Observations filed Oct. 24, 2016 by the Proprietor: An Udder IP Company Ltd in the Opposition of EP Patent 1737291, 47 pages.
Amendments and Observations filed Oct. 25, 2016 by the opponent: GEA Farm Technologies GmbH in the Opposition of EP Patent 1737291, 13 pages.
Nov. 10, 2016 EPO Communication re: the Proprietor, An Udder IP Company Ltd's request concerning the staying/postponement of the opposition proceedings, Opposition of EP Patent 1737291, 1 page.
Nov. 25, 2016 EPO Communication re: results of the oral proceedings, Opposition of EP Patent 1737291, 5 pages.
Dec. 8, 2016 EPO Communication; Details and minutes of the oral proceedings, Opposition of EP Patent 1737291, 13 pages.
Jul. 27, 2017 EPO Communication; State of the Opposition Procedure and Summons to Attend Oral Proceedings, Opposition of EP Patent 1737291, 10 pages.
Mar. 30, 2017 EPO Communication, State of the Opposition Procedure and Invitation to File Observations, Opposition of EP Patent 1737291, 10 pages.
Response filed by the proprietor, an Udder IP Company LTD on Jun. 2, 2017, 4 pages.
Response filed by the opponent, GEA Farm Technologies GmbH. on May 29, 2017, 5 pages.
European Search Report dated Oct. 13, 2017, for European Application No. 17171229.2, 6 pages.
Mar. 13, 2018 Letter from the Proprietor, An Udder IP Company Ltd, Regarding the Opposition Procedure for Opposition of EP Patent 1737291, 23 pages.
May 17, 2018 EPO Communication; Details and minutes of the oral proceedings, Opposition of EP Patent 1737291, 9 pages.
May 31, 2018 Interlocutory Decision in Opposition Proceedings, Opposition of EP Patent 1737291, 49 pages.
Sep. 27, 2018 Statement of Grounds for Appeal, Opposition of EP Patent 1737291, 29 pages.
International Search Report and Written Opinion from PCT/US2018/058897, dated Feb. 25, 2019, 19 pages.
International Search Report and Written Opnion from PCT/US2018/059041, dated Mar. 8, 2019, 20 pages.
Feb. 4, 2019 Reply to Grounds for Appeal, Opposition of EP Patent 1737291, 32 pages.

\* cited by examiner

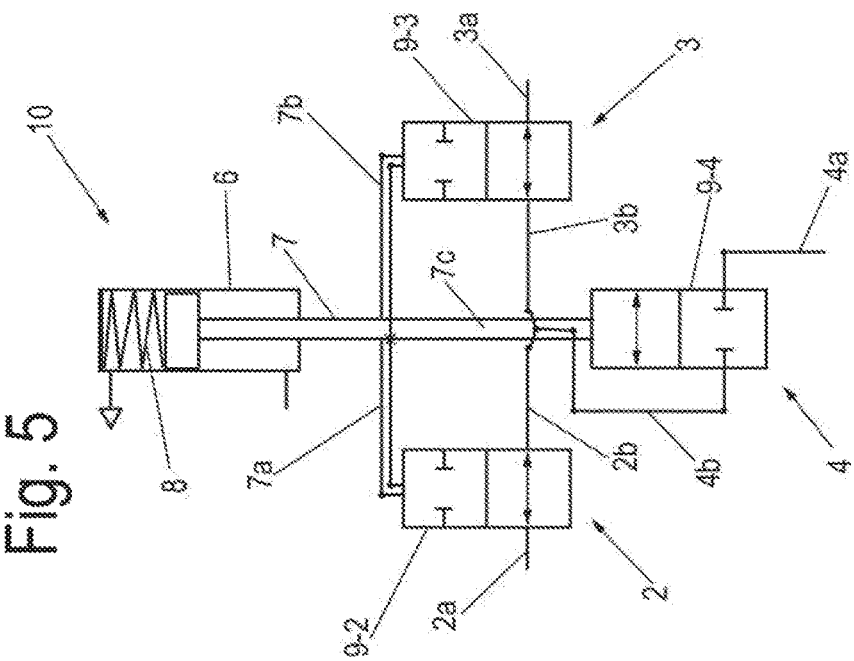
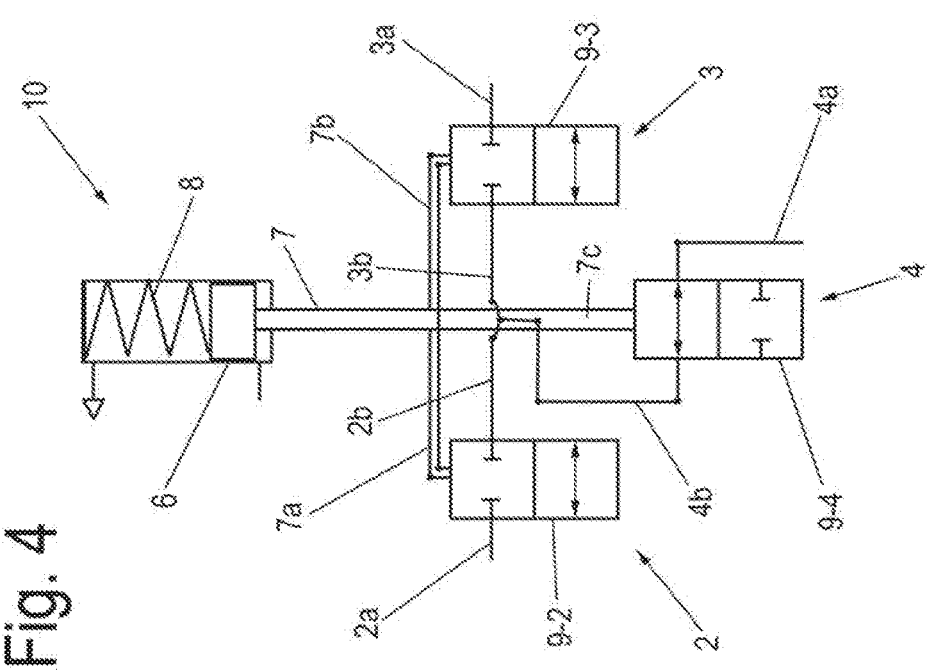

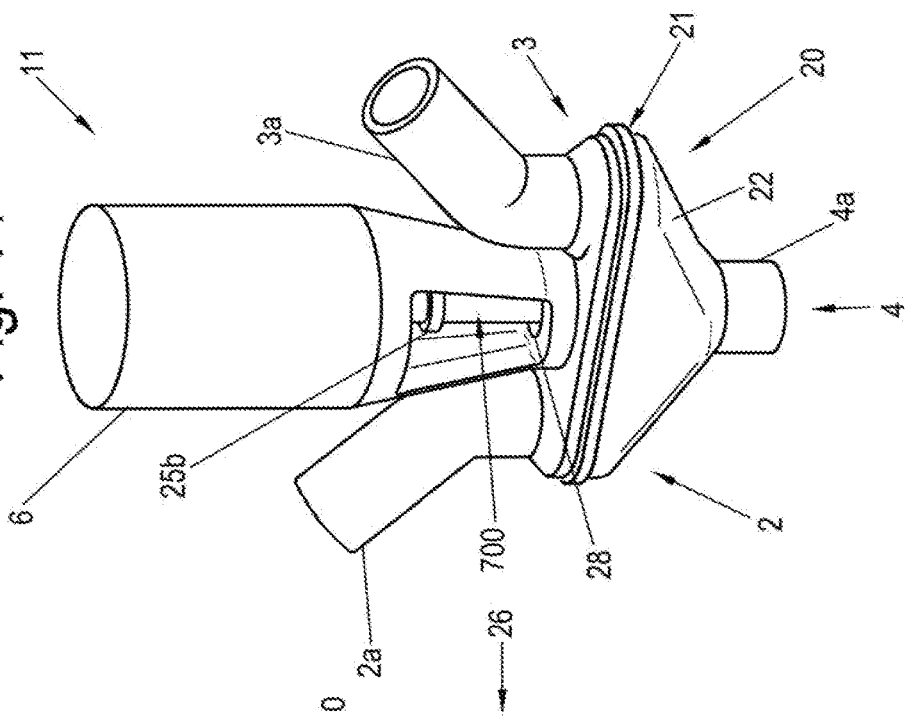
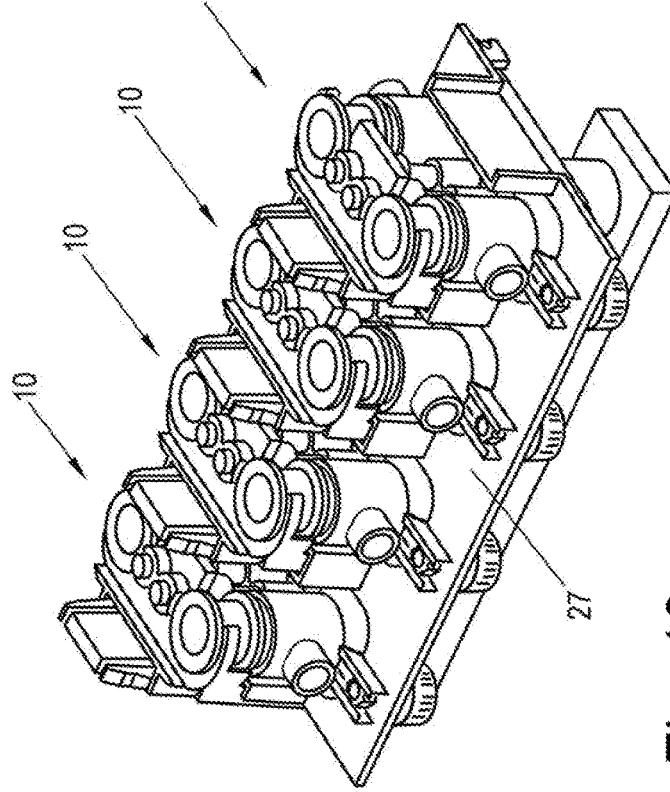

SAFETY VALVE DEVICE

CROSS REFERENCE TO RELATED APPLICATION

This application is a continuation of U.S. application Ser. No. 14/135,798, filed Dec. 20, 2013, which is incorporated by reference in its entirety.

FIELD AND BACKGROUND OF THE INVENTION

The invention relates to a safety valve device used in a milking installation, in particular for the automatic milking of milk-producing animals, for example cows, sheep, goats etc.

The automatic milking process may be performed by means of so-called milking robots. The safety valve device is provided for protecting and sealing off the lines in which so-called "good milk" (for example, milk intended for sale or feeding to calves) is conducted, and also the "good milk" itself, from undesired media, for example cleaning and flushing media, from lines conducting so-called "bad milk" (for example, adulterated milk), and also for preventing undesired media from being drawn in.

It is necessary to observe and adhere to relevant national regulations and guidelines, for example the American FDA guidelines, which apply to milking installations and milking facilities which come into contact with milk.

Such a safety valve arrangement is also referred to as a "block-bleed-block valve arrangement". Here, a medium flows through a cavity. The cavity can be closed off at one end by means of a first valve and at another end by means of a second valve. Depending on the flow direction, the valves are referred to as inlet and outlet valves. The cavity itself is provided, for aeration purposes, with a ventilation valve. In a throughflow position, the first and second valves are open so as to permit a flow of the medium through the first and second valves and through the cavity. Here, the ventilation valve is closed. If the first and second valves are closed in order to assume the ventilation position, the ventilation valve must remain closed until the first and second valves are completely closed. Only then can the ventilation valve be opened for the purpose of ventilating the cavity. This also applies in the reverse situation, that is to say when the safety valve device is switched over from the ventilation position into the throughflow position.

WO 2011/028293 A2 describes a safety valve for an automatic milking installation.

Owing to the ever increasing demands in particular for high throughput rates and continuous, low-maintenance operation, or operation with long maintenance intervals, in the case of modern milking installations or milking robots which are complex and expensive, there is a need for improved safety valve devices.

SUMMARY OF THE INVENTION

Against this background, it is the object of the invention to provide an improved safety valve device.

A safety valve device according to the invention for a milking installation for milking milk-producing animals includes a first valve with a first port and with a first port connector, a second valve with a second port and with a second port connector, a third valve with a third port and a third port connector, a drive, an actuator, and at least one valve spring, the first port connector of the first valve being connected to the second port connector of the second valve, and the safety valve device being designed such that it can be adjusted from a first switching position, in which the first valve and the second valve are closed in order to block the first port and the second port and the third valve is open to vent to atmospheric pressure or at least a pressure less than the pressure inside the first and second valves, passing through a transition position, in which the first valve, the second valve and the third valve are closed, into a second switching position, in which the first valve and the second valve are open in order to connect the first port to the second port via the port connectors and the third valve is closed in order to block the third port, and back. The first valve, the second valve and the third valve have a common actuator and a common drive which is coupled to ("operatively engaged with") the common actuator.

It is thus advantageously achieved that the first, second and third valves, with only one actuator and only one drive, require less structural space than the case of the prior art, which provides one drive for each valve.

Furthermore, the electrical control is simplified because one common actuator is provided. During the actuation of the safety valve device, the actuator is adjusted by the drive and, owing to its mechanical design, transmits the movement to the individual valves such that the ventilation position and the throughflow position are reliably assumed, wherein the transition position is reliably passed through.

In one embodiment, the first valve, the second valve and the third valve have in each case one valve element which interacts with ("engages") in each case one valve seat. A defined separation of the three valves can be achieved in this way.

It is also provided that the valve seats are constituent parts of a common valve housing and communicate with an interior of the common valve housing, the valve housing forming, by way of the interior, the port connectors of the valves. No further assembly of the three valves with respect to one another, that is to say by way of their port connectors, is necessary. Furthermore, for assembly, it is advantageous if the common valve housing has at least two housing parts which are connected to one another.

In a further embodiment, the common actuator is configured with a stroke composed of two ranges, the first range of the stroke being assigned to the adjustment of the safety device from the first switching position into the transition position, and the second range of the stroke being assigned to the adjustment of the safety device from the transition position into the second switching position and vice versa. In this way, it is possible to realize simple mechanical control of the switching phase of the safety valve device without additional outlay for electrical or electronic control. Furthermore, this can result in a direct (in the case of an electric drive) or indirect (in the case of a pneumatic drive with compressed-air generation by electrical means) saving of electrical energy.

For this purpose, it is provided that the common actuator is designed such that, in the first range of its stroke, it closes the third valve and maintains the closed state of the first valve and of the second valve, and in the second range, it opens the first valve and the second valve and maintains the closed state of the third valve and vice versa. It is thus possible to provide a common actuator for actuating all of the valves.

For this purpose, the common actuator has an actuation portion for coupling to (the term "coupling" is sometimes used herein interchangeably with "operatively engaged with" and merely references a connection or other operational relationship between two elements) the first valve, an actuation portion for coupling to the second valve, and an actuation portion for coupling to the third valve. It is thus also possible for the individual valves, depending on the construction thereof, to be coupled independently of one another in different ways to the common actuator. For example, mechanical and reliable control can be realized in a simple manner by means of guides and stops.

In one embodiment, the common actuator is arranged outside the common valve housing. This permits simple assembly and maintenance.

In this regard, the common actuator may be guided in an adjustable manner by means of an actuator guide on a frame and/or at least one guide element of the safety valve device. This permits a compact design.

In yet a further embodiment, the common actuator is preloaded (the term "preloaded" is sometimes used herein interchangeably with "biased") toward the ventilation position by means of at least one actuator spring, in the ventilation position the first valve being preloaded ("biased") toward a closed position by means of a valve spring and the second valve being preloaded ("biased") toward a closed position by means of a valve spring, and in the ventilation position the third valve being preloaded ("biased") into an open position by means of a valve spring which is connected to the actuator. This spring-controlled mechanism makes it possible for the two switching positions, ventilation position and throughflow position, and the transition position in the switching phase to be reproduced and assumed in a reliable manner.

An advantageously simple assembly is attained if the actuator has at least two actuation elements which are connected to and can be released again from one another, one actuation element having an actuation portion for coupling to the first valve and another actuation portion for coupling to the second valve, and the other actuation element having an actuation portion for coupling to the third valve.

In an alternative embodiment, it is provided that the common actuator comprises an actuation body, two actuation elements, and three actuation arms, wherein each of the three actuation arms is coupled to in each case one of the valves.

Here, one actuation element is coupled to the actuation body, and the other actuation element is coupled by way of one end to the former actuation element and by way of the other end to the drive. This gives rise to a space-saving arrangement.

In a further embodiment, the actuation body is arranged with the three actuation arms within the common valve housing. This yields the particular advantage of a space-saving arrangement. Furthermore, in this way, the drive may be arranged on the valve housing such that the actuator is arranged partly in a drive housing, on the one hand, and partly in the valve housing, on the other hand.

In yet a further embodiment, the actuation body is coupled to the actuation arms, each actuation arm being coupled to in each case one valve element. In this way, that portion of the actuation arm which is coupled to the valve element may form a constituent part of the respective valve, resulting in a simple and compact arrangement.

In one embodiment, the actuation body may be produced in one piece with the actuation arms and with at least one actuation element of the actuation elements. Here, the material may be a plastics material, a metal or a combination of these. It is self-evidently also possible for the actuator to be formed entirely in one piece or for the actuator to be formed as a welded structure composed of a food-safe metal, for example a correspondingly weldable high-grade steel.

In yet a further embodiment, it is provided that the valve elements of the first and second valves point in the opposite direction to the valve element of the third valve. Simple mechanical control of the different switching positions is possible in this way.

In one embodiment, each valve is assigned, for interaction, at least one secondary sealing element and at least one main sealing element. Simple setting of the different switching positions is possible in this way.

It is also provided that each valve element has at least one secondary sealing element and at least one main sealing element. It is thus possible for a doubled sealing action in the ventilation position and in the throughflow position of the one or more respectively closed valve(s), and also the transition position, to be realized in a simple manner.

In an alternative embodiment, the at least one secondary sealing element and the at least one main sealing element are arranged in a valve housing and/or a housing part. It is thus possible to realize a simplified design, because the valve elements need not be fitted with the sealing elements.

It is also provided that the at least one secondary sealing element and the at least one main sealing element are arranged concentrically with respect to and spaced apart from one another. It is thus made possible for the respective valve to be sealed off, on the one hand, by means of the at least one secondary sealing element and the at least one main sealing element, and on the other hand, by means of only the at least one secondary sealing element.

In one embodiment, the at least one secondary sealing element and the at least one main sealing element are provided as separate components. It is self-evidently also possible, in an alternative embodiment, for these to be formed in one piece with a common body, wherein they are then for example different sealing portions, for example beads, lips etc., of the common body. It is also conceivable for the at least one secondary sealing element and the at least one main sealing element and the common body to be formed as a two-component or multi-component injection-molded part.

In a further embodiment, at least one of the valve elements has an intermediate element and a retaining element. This design makes a particularly advantageous design possible, wherein the at least one main sealing element is arranged between the respectively associated actuation arm and the intermediate element, and the at least one secondary sealing element is arranged between the intermediate element and the retaining element. A secure and captive fit of the sealing elements is thus ensured.

A further embodiment provides that, in the ventilation position, the main sealing elements of the first valve and of the second valve interact with the respective valve seat so as to form a closed state of the associated valve, and that the main sealing element and the secondary sealing element of the third valve are not in engagement with the associated valve seat of the third valve so as to form an open state of the third valve.

Here, it is also provided that, in the throughflow position, the main sealing elements and the secondary sealing elements of the first and second valves interact, whilst not in engagement with the respective valve seat, so as to form an open state of the associated valve, and that the main sealing element and the secondary sealing element of the third valve interact with the associated valve seat of the third valve so as to form a closed state of the third valve.

For the transition position, it is provided here that, in the transition position, the secondary sealing elements of the first and second valves interact with the respective valve seat so as to form a closed state of the associated valve, and that the secondary sealing element of the third valve interacts with the associated valve seat of the third valve so as to form a closed state of the third valve. It is thus possible for the switching positions and the transition position to be realized mechanically and in a simple manner by means of one drive and one actuator.

Furthermore, by means of the valve springs and the actuator spring, it is possible for one switching position to be in the form of a safety position. This means that a safe switching position is automatically assumed in the event of failure of the energy supply for the actuation of the drive of the safety valve device. For example, the ventilation position may be the safety position.

In another embodiment, the common actuator comprises two actuation elements, an actuation plate, a central body with two actuation bars, and two actuation arms, wherein each of the two actuation arms is coupled to in each case one of the two valves, wherein the actuation element is coupled via an actuation portion to a third valve. This gives rise to a simple design.

It is also provided that the central body is arranged with the two actuation arms within the common valve housing. This permits a compact design.

In yet a further embodiment, each actuation arm is coupled to in each case one valve element, and the actuation portion is coupled to a third valve element. This allows the valves to be actuated independently of one another, wherein actuation may be performed from only one side.

For this purpose, it is provided that the actuation arms are jointly actuable, the actuation portion being movable independently of the actuation arms.

In yet a further embodiment, the valve elements of the first and second valves point in the opposite direction to the valve element of the third valve. It is thus advantageously possible for the third valve to be utilized as a ventilation valve with a downward outlet for collecting liquids.

Furthermore, in a further embodiment, it is provided that the safety valve device is equipped with at least one sensor device for detecting the respective switching position. This may be realized, for example, by virtue of the actuator being coupled to a sensor actuator which interacts with a sensor. Here, because the actuator is coupled to the valves, the actuator position is detected as the switching position of the safety valve device.

A safety valve arrangement of a milking installation for milking milk-producing animals has at least one safety valve arrangement as described above. For simplified maintenance and ease of assembly and disassembly, the safety valve arrangement may for example be formed in the manner of a drawer or the like.

Further advantages and details will emerge from the exemplary embodiment illustrated in the figures of the drawing, in which:

BRIEF DESCRIPTION OF THE DRAWINGS

FIG. 4 is a schematic circuit-symbol-based illustration of a safety valve device according to the invention, in a first switching position;

FIG. 5 is a schematic circuit-symbol-based illustration of the safety valve device according to the invention as per FIG. 4, in a second switching position;

FIG. 13 shows a schematic perspective view of a safety valve arrangement;

FIG. 14 shows a schematic, perspective and partially sectional view of a third exemplary embodiment of the safety valve device according to the invention as per FIGS. 4 and 5;

DETAILED DESCRIPTION OF THE DRAWINGS

Figure 1:
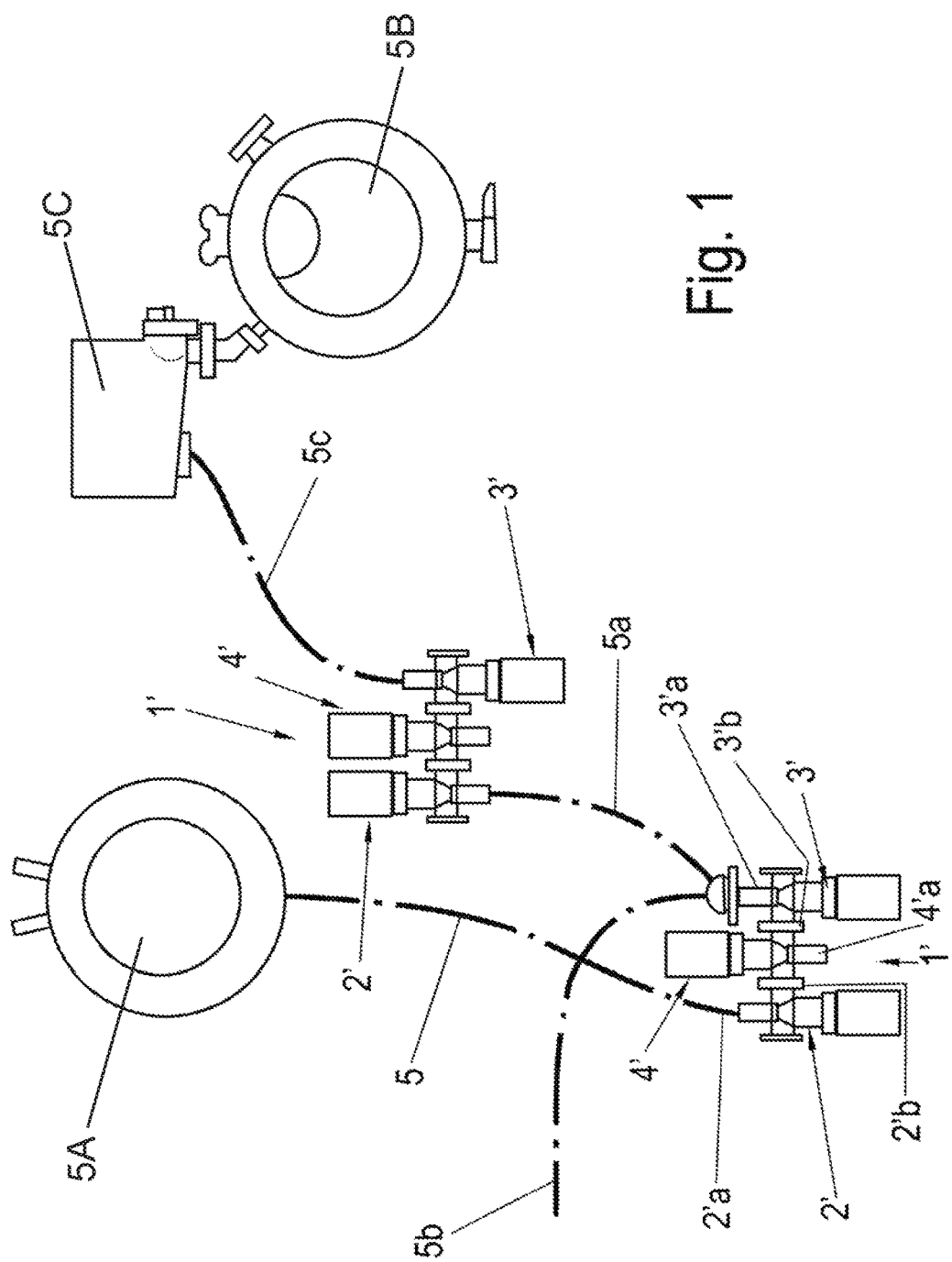
FIG. 1 is a schematic illustration of an exemplary usage situation with a conventional safety valve device.

In the figures, identical or similar functional elements and components are denoted by the same reference numerals.

The expressions "top" and "bottom" relate to the respective arrangement in the figures. An installation position, for example upside-down, sideways or in some other position, is not restricted to these designations.

Figure 2:
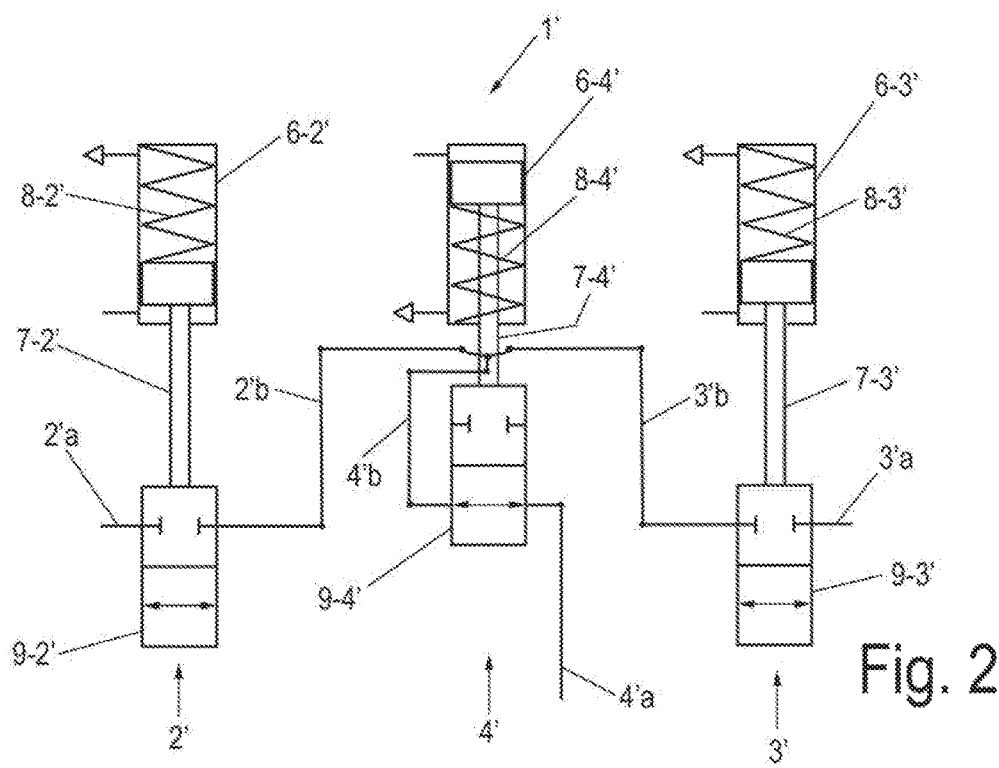
FIGS. 2 and 3 show, in schematic circuit-symbol-based illustrations, the safety valve device in different switching positions.
Figure 3:
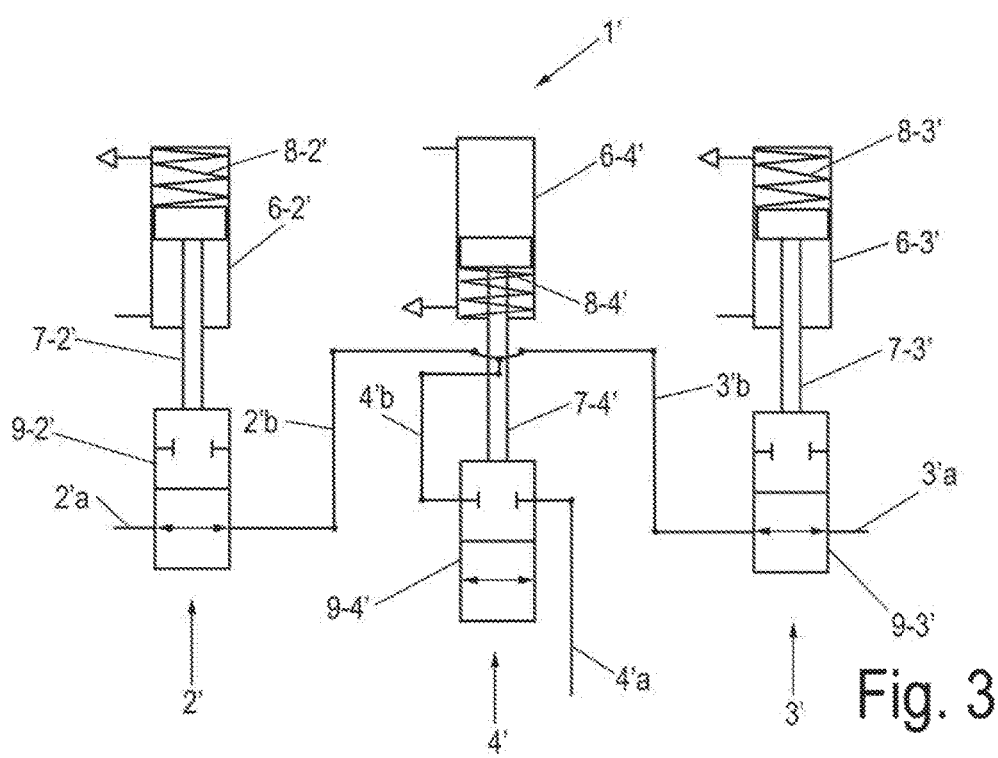

FIG. 1 is a schematic illustration of an exemplary usage situation with a conventional safety valve device 1'. FIGS. 2 and 3 show, in schematic circuit-symbol-based illustrations, the safety valve device 1' in different switching positions.

The illustration shows two safety valve devices 1' of a milking installation for milking milk-producing animals, for example cows. Two such safety valve devices 1' are provided for each teat on an udder of a milk-producing animal. The safety valve device 1' serves for preventing undesired media, such as contaminated milk, sanitizers, dirt, and debris, from being inadvertently drawn out of a "bad milk" line (in this case for example a port line 5) into a "good milk" line (in this case for example a port line 5a and 5c).

The safety valve device 1' comprises three individual valves 2', 3' and 4', specifically a first valve 2', a second valve 3' and a third valve 4'. The first valve 2' and the second valve 3' are also referred to as "block valves". Depending on the flow direction of the medium flowing through, the first valve 2' is designated as inlet valve and the second valve 3' is designated as outlet valve, or vice versa. The third valve 4' is normally designated as "bleed valve". The three valves 2', 3' and 4' are connected to one another such that the first valve 2' and the second valve 3' are connected in series in terms of flow, wherein the third valve 4' is connected to the port connector of the first valve 2' and of the second valve 3'. Thus, the safety valve device 1', which is also referred to as a "block-bleed-block valve", is formed.

The first valve 2' has a first port 2'a and a first port connector 2' b. In the same way, the second valve 3' is provided with a second port 3'a and a second port connector 3'b. The third valve 4' has a third port 4'a and a third port connector 4'b.

The first port connector 2'b of the first valve 2' is connected to the second port connector 3'b of the second valve 3' and to the third port connector 4'b of the third valve 4'. The port connectors 2'b, 3'b and 4'b form a cavity which can be traversed by a flow of a medium.

The safety valve device 1' can be adjusted or switched over from a first switching position, referred to as ventilation position, into a second switching position, referred to as throughflow position, and back.

In the ventilation position, the first valve 2' and the second valve 3' are closed, and the third valve 4' is open so that reduced or atmospheric pressure is available at the third port 4'a.

In the throughflow position, the third valve 4' is closed, wherein the first port 2'a and the second port 3'a are connected by the open first valve 2' and the open second valve 3'.

In the exemplary arrangement shown in FIG. 1, two safety valve devices 1' are provided, one of which, at the bottom left in FIG. 1, is connected via the first port 2'a by means of a port line 5 to a vessel 5A, for example for storing "bad milk". The second port 3'a is connected via a port line 5a to the first port 2'a of the other safety valve device 1' and via a second port line 5b to a milk receptacle of a milking appliance (not shown). The second port 3'a of the other safety valve device 1' is connected via a further port line 5c to a further vessel 5B (not shown in any more detail) which is provided for example for storing "good milk". The good milk may pass through a conventional chiller and a milk meter 5C before being stored in the good milk vessel 5B.

The conventional safety valve device 1' is shown in schematically simplified form in FIG. 2 and FIG. 3 by means of circuit symbols. Each valve 2', 3', 4' has a drive 6-2', 6-3', 6-4' which is for example a pneumatic cylinder. Each drive 6-2', 6-3', 6-4' is coupled to an actuator 7-2', 7-3', 7-4' which, in this case, is provided with in each case one valve spring 8-2', 8-3', 8-4', for example a pressure spring to "bias" the valve toward a desired direction or position. Each actuator 7-2', 7-3', 7-4' is coupled to a valve block 9-2', 9-3', 9-4'. The valve blocks 9-2', 9-3', 9-4' here have the respective ports 2'a, 3'a, 4'a and 2'b, 3'b, 4'b.

FIG. 2 shows the first switching position (ventilation position) of the safety valve device 1'. In the first switching position, the first valve 2' and the second valve 3' are closed. The third valve 4' is open and connects the port connectors 2'b, 3'b and 4'b to the third port 4'a. The third port 4'a may for example be connected to a further line (not shown) which communicates for example with the atmosphere or with a vessel.

In the ventilation position, the ports 2'a and 3'a are closed and no flow can pass through these. The third port 4'a is open, such that the port connectors 2'b, 3'b and 4'b can be "ventilated".

FIG. 3 shows the second switching position of the safety valve device 1', in which the first valve 2' and the second valve 3' are open. Here, the third valve 4' is closed.

If the first switching position, the ventilation position, of the safety valve device 1' the first valve 2' and the second valve 3' are both closed and the third valve 4' is open to provide a vent between the first valve 2' and the second valve 3'. In the second switching position, the throughflow position, the valves 2' and 3', also referred to as throughflow valves, are both open and the third valve 4' is closed. A switchover phase is of importance here. The first valve 2' and the second valve 3' may be opened, in order to assume the throughflow position, only after the third valve 4' has been closed. Likewise, the third valve 4' may be opened, for the ventilation position, only after the first valve 2' and the second valve 3' have been closed.

In the throughflow position, the ports 2'a and 3'a are open and are connected to one another by the port connectors 2'b and 3' b, such that a flow can pass from the first port 2'a to the second port 3'a through the third valve 4', which is now closed.

In the conventional safety valve device 1' with the three individual valves 2', 3', 4', the two switching positions with the switchover phases are regulated through control of the individual drives 6-2', 6-3', 6-4'.

FIG. 4 is a schematic circuit-symbol-based illustration of a safety valve device 10 according to the invention in the first switching position, that is to say in the ventilation position. FIG. 5 is a schematic circuit-symbol-based illustration of the safety valve device 10 according to the invention as per FIG. 4 in a second switching position, that is to say in the throughflow position.

By contrast to the conventional safety valve device 1', the safety valve device 10 according to the invention has only one drive 6, the latter being coupled to one common actuator 7 and to one valve spring 8, for example a pressure spring. Furthermore, the safety valve device 10 according to the invention comprises a valve block 9-2 of a first valve 2, a valve block 9-3 of a second valve 3 and a valve block 9-4 of a third valve 4. The valve blocks 9-2, 9-3, 9-4 are coupled to the common actuator 7. For this purpose, the common actuator 7 has an actuation portion 7a for the actuation of the valve block 9-2 of the first valve 2, an actuation portion 7b for the actuation of the valve block 9-3 of the second valve 3, and an actuation portion 7c for the actuation of the valve block 9-4 of the third valve 4.

In the ventilation position shown in FIG. 4, the valve block 9-2 of the first valve 2 and the valve block 9-3 of the second valve 3 are closed, wherein the valve block 9-4 of the third valve 4 is open. In the ventilation position, no flow can pass from the first port 2a to the second port 3a, and vice versa.

When the safety valve device 10 situated in the ventilation position as per FIG. 4 is actuated, the valve block 9-2 of the first valve 2 and the valve block 9-3 of the second valve 3 are held (biased) closed by the valve spring 8, for example a pressure spring, until the valve block 9-4 of the third valve 4 is closed. Only thereafter do the valve block 9-2 of the first valve 2 and the valve block 9-3 of the second valve 3 open so as to assume the throughflow position shown in FIG. 5. In the throughflow position, a flow can pass from the first port 2a to/through the second port 3a, because the third port 4a is closed.

Conversely, the valve block 9-2 of the first valve 2 and the valve block 9-3 of the second valve 3 are initially closed until the valve block 9-4 of the third valve 4 then opens so as to assume the ventilation position.

The assumption of the two switching positions with the associated switchover phases is controlled by mechanical means, as will be described below.

Figure 6A:
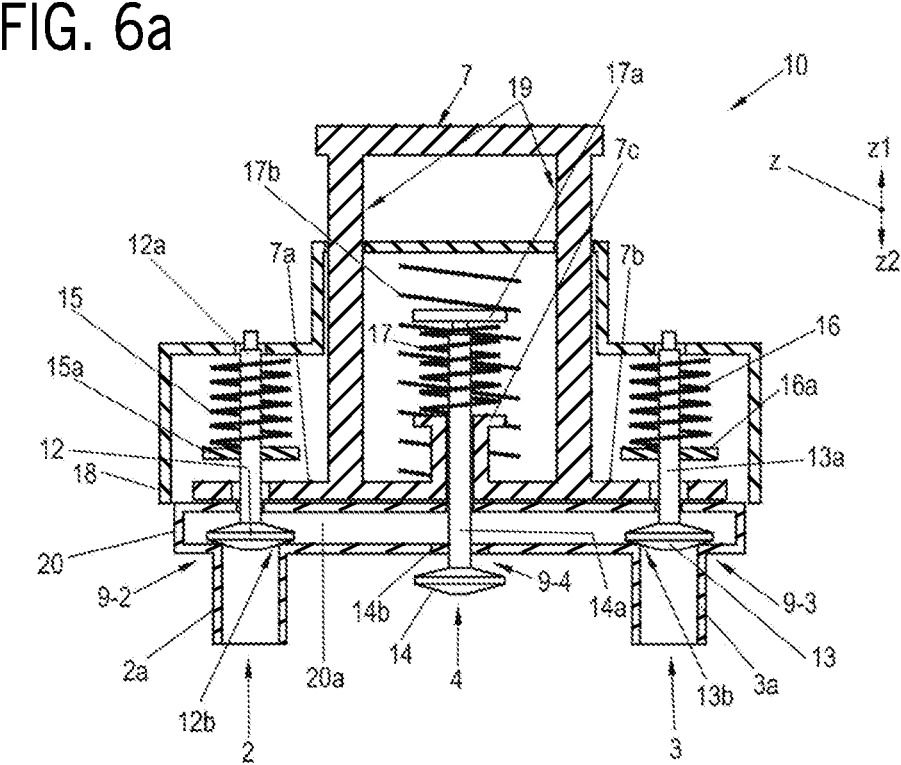
FIGS. 6a through 6c are schematic sectional illustrations of a first exemplary embodiment of the safety valve device according to the invention as per FIGS. 4 and 5, in different switching positions.
Figure 6B:
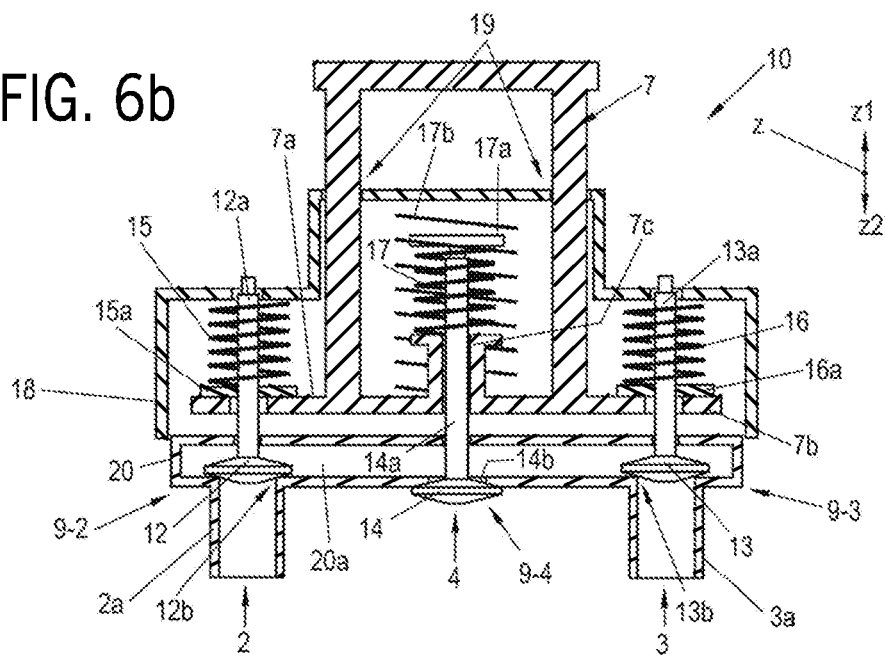
Figure 6C:
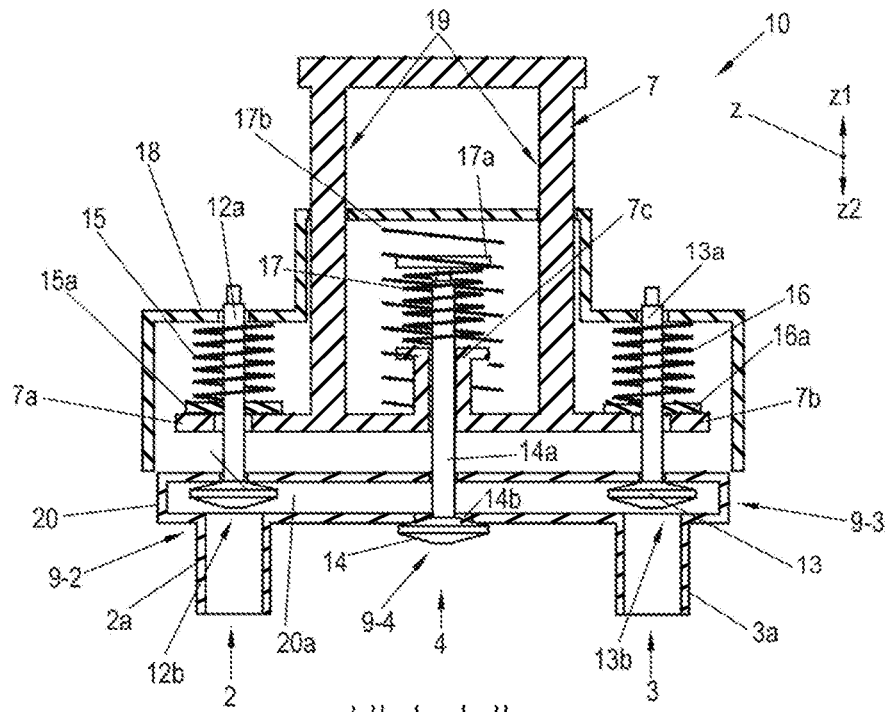

In this regard, FIGS. 6a-6c are schematic sectional illustrations of a first exemplary embodiment of the safety valve device 10 according to the invention as per FIGS. 4 and 5, in different switching positions. Here, FIG. 6a shows the first or ventilation position. FIG. 6b illustrates a switchover phase or transition position, and FIG. 6c shows the second or throughflow position.

Figure 7:
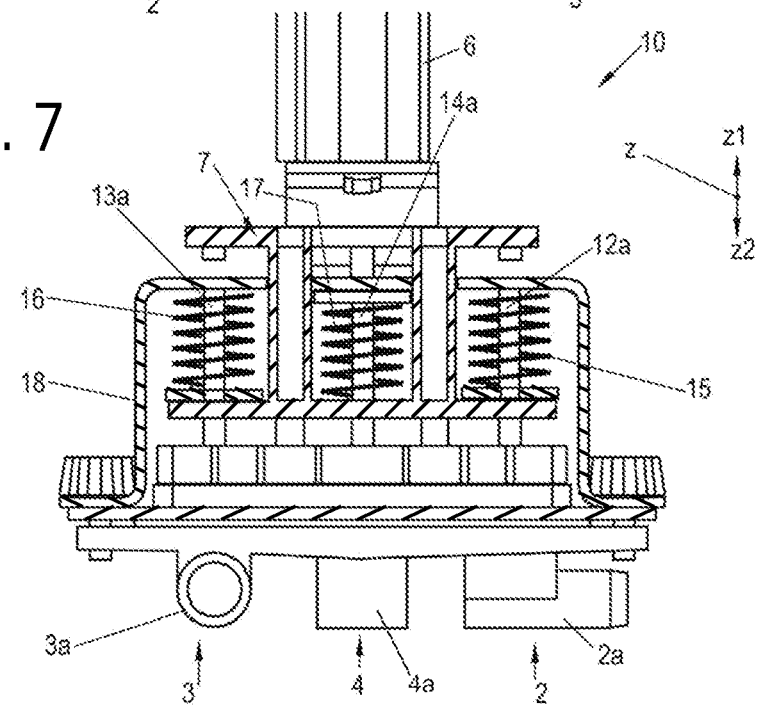
FIG. 7 shows the first exemplary embodiment of the safety valve device according to the invention as per FIGS. 6a-6c in a view from the rear.

FIG. 7 shows the first exemplary embodiment of the safety valve device 10 according to the invention as per FIGS. 6a-6c in a view from the rear.

A direction z is used to indicate adjustment directions for the actuation of the safety valve device 10. A direction z1 denotes the actuation direction for assuming the throughflow position, wherein an opposite direction z2 denotes the actuation direction for assuming the ventilation position.

In the first exemplary embodiment, the safety valve device 10 according to the invention has three valves 2, 3, 4 having in each case one valve block 9-2, 9-3, 9-4, a common drive 6 (see FIG. 7), an actuator 7, biasing valve springs 15, 16, 17 (or other biasing device can be used in the place of any of the springs described herein) and a common valve housing 20 with an interior 20a.

The first valve 2 has the first port 2a, the second valve 3 has the second port 3a, and the third valve 4 has the third port 4a. As seen in FIG. 6c, the port connectors 2b, 3b, 4b of the valves 2, 3, 4 are realized in this case by the common valve housing 20 with the interior 20a.

The safety valve device 10 is assigned a frame 18 which bears and accommodates functional parts and enables the safety valve device 10 to be mounted on appliances (not shown). Furthermore, the actuator 7 is arranged in the frame 18 so as to be guided in an actuator guide 19.

Here, the actuator 7 comprises two columns which extend in the z direction and which are connected at the upper ends thereof by a transverse connector extending at right angles thereto. The lower ends of the columns are connected to a lower transverse connector which is arranged parallel to the upper transverse connector. Lateral ends of the lower transverse connector project in each case to the left and to the right from the columns and extend in each case over a valve 2, 3. Here, that end of the lower transverse connector which is arranged in the region of the first valve 2 forms an actuation portion 7a for the first valve 2. The other end of the lower transverse connector, which is arranged in the region of the second valve 3, forms an actuation portion 7b for the second valve 3. A projection as an actuation portion 7c for the third valve 4 projects in an upwardly extending manner in the z1 direction in the center of the lower transverse connector, between the columns. In the ventilation position shown in FIG. 6a, the lower transverse connector of the actuator 7 rests with the bottom sides of the actuation portions 7a and 7b on the valve housing 20.

The first valve 2 comprises a valve element 12 with a valve shank 12a and a valve spring 15 with a valve spring disk 15a. The valve spring disk 15a is fixedly connected to the valve shank 12a. The valve element 12 interacts with a valve seat 12b which is arranged within the valve housing 20, in the interior 20a thereof. The valve element 12 serves for connecting the port 2a to the interior 20a of the valve housing 20 and, in the ventilation position shown in FIG. 6a, closes off a connection between the interior 20a of the valve housing 20 and the first port 2a. The valve shank 12a is held, so as to be guided in a longitudinally displaceable manner, in the valve housing 20 by way of seals (not illustrated) and in the frame 18. These illustrations are merely schematic, and an implementation is readily conceivable to a person skilled in the art.

Here, the valve spring 15 is a pressure spring and surrounds the valve shank 12a within the frame 18 and is arranged between the valve spring disk 15a and the frame 18. In the ventilation position, the valve spring disk 15a is arranged at a distance from an actuation portion 7a of the actuator 7. The valve spring 15 exerts a preload ("bias") on the valve element 12 and presses the latter into the valve seat 12b, whereby, in the ventilation position, the first valve 12 is closed.

Similarly, the second valve 3 comprises a valve element 13 with a valve shank 13a, and a valve spring 16 with a valve spring disk 16a. The valve spring disk 16a is fixedly connected to the valve shank 16a. The valve element 13 interacts with ("engages") a valve seat 13b which is also arranged within the valve housing 20, in the interior 20a thereof. In the ventilation position shown in FIG. 6a, the valve element 13 closes off a connection between the interior 20a of the valve housing 20 and the first port 3a. The valve element 13 serves for connecting the port 3a to the interior 20a of the valve housing 20. Like the valve shank 12a of the first valve 2, the valve shank 13a is held in a guided manner in the valve housing 20.

In this case, too, the valve spring 16 is preferably a pressure spring and surrounds the valve shank 13a within the frame 18, wherein the valve spring 16 is arranged between the valve spring disk 16a and the frame 18. In the ventilation position, the valve spring disk 16a is arranged at the same distance from an actuation portion 7b of the actuator 7 as the valve spring disk 15a of the first valve 2. The valve spring 16 exerts a preload ("bias") on the valve element 13 and presses the latter into the valve seat 13b, whereby, in the ventilation position, the second valve 12 is closed.

The valve elements 12 and 13 are in the form of valve disks which are fastened in each case to one end of the associated valve shank 12a, 13a and which interact by way of their front sides with the respective valve seat 12b, 13b. Here, the front side refers to that side of the valve element 12, 13 which is situated opposite the respective valve shank 12a, 13a.

The third valve 4 comprises a valve element 14 with a valve shank 14a, and a valve spring 17 with a valve spring disk 17a. The valve element 14 interacts with a valve seat 14b which is arranged in the wall of the valve housing 20, wherein that side of the valve element 14 to which the valve shank 14a is fastened interacts with the valve seat 14b. Here, the valve element 14 is arranged below, and on the outside of, the valve housing 20. The valve shank 14a extends through the valve seat 14b, and through the upper wall, situated thereabove, of the valve housing 20, into a receptacle of the actuation portion 7c of the actuator 7. The upper end of the valve shank 14a of the third valve 4 projects in the z direction out of the actuation portion 7c of the actuator 7 and is fixedly connected to the valve spring disk 17a. The valve spring 17 in the form of a pressure spring is arranged between the valve spring disk 17a and the upper end of the actuation portion 7c of the actuator 7.

Furthermore, at least one actuator spring 17b, for example also a pressure spring, is arranged around the actuation portion 7c of the actuator 7 and the valve spring 17, which actuator spring is supported on the central part of the lower transverse connector of the actuator 7 and an upper inner side of the frame 18. The actuator spring 17b exerts a preload ("bias") force on the actuator 7 in the z2 direction such that the actuator 7 is preloaded into the ventilation position and, here, rests on the valve housing 20.

The actuator 7, with the columns and transverse connectors including the actuation portions 7a, 7b, 7c thereof, may for example be a unipartite plastics injection-molded part. Other materials and/or combinations of different materials are self-evidently also possible. It is likewise possible for the actuator 7 to be assembled from different components which are connected to one another.

The valve element 14 serves for connecting the interior 20a of the valve housing 20 to the port 4a (FIGS. 1 through 5), and in the throughflow position shown in FIG. 6c, closes off a connection between the interior 20a of the valve housing 20 and the port 4a (FIG. 7).

In the ventilation position shown in FIG. 6a, the valve seat 14b is not closed off by the valve element 14. The third valve 4 is open. Here, the valve spring 17 is connected by way of in each case one end to the actuation portion 7c and to the valve spring disk 17a such that, in the ventilation position, in which the actuator 7 is pressed against the valve housing 20 by the actuator spring 17b, the valve spring disk 17a of the third valve 4 is pulled and preloaded in the z2 direction by the valve spring 17 such that the valve element 14 of the third valve 4 does not close off the valve seat 14b, that is to say the third valve 4 remains in the open position.

When the safety valve device 10 is actuated by adjustment of the actuator 7 in the actuation direction z1 by means of the drive 6 (FIG. 7), firstly, the valve spring 17 of the third valve 4 is pressed against the valve spring disk 17a by the associated actuation portion 7c of the actuator 7, whereby the valve shank 14a with the valve element 14 is adjusted in the z1 direction such that the valve element 14 of the third valve 4 closes off the valve seat 14b. The interior 20a of the valve housing 20 is thus closed off because the first valve 2 and the second valve 3 remain closed. This is the case in the transition position shown in FIG. 6b because the actuation portions 7a and 7b of the actuator 7 do not immediately actuate the respectively associated valve spring disk 15a of the first valve 2 and the valve spring disk 16a of the second valve 3, but must firstly cover the distance that exists in the z1 direction. At the end of the transition position in FIG. 6b, the actuation portions 7a and 7b of the actuator 7 are in contact with the valve spring disk 15a of the first valve 2 and with the valve spring disk 16a of the second valve 3. Thus, in the transition position, no air can pass into the interior 20a.

With further actuation, that is to say adjustment of the actuator 7 in the z1 direction, the valve spring disk 15a of the first valve 2 and the valve spring disk 16a of the second valve 3 are also adjusted in the z1 direction by the associated actuation portions 7a and 7b. Since the valve spring disk 15a of the first valve 2 and the valve spring disk 16a of the second valve 3 are fixedly connected to the respective valve shank 15a, 16a of the associated valve element 12, 13, the first valve 2 and the second valve 3 are opened, that is to say the valve elements 12 and 13 open the respective valve seat 12b and 13b. As a result, the interior 20a of the valve housing 20 is connected to the ports 2a and 3a. The valve seat 14b of the third valve 4 remains closed, wherein the valve spring 17 of the third valve 4 is compressed with even greater intensity as a result of the further actuation travel of the actuation portion 7c in the z1 direction, which results in an intensification of the closure fit of the valve seat 14b. Thus, the open position illustrated in FIG. 6c is finally attained.

When the actuator 7 is actuated in order to reassume the ventilation position, the actuator is actuated in the z2 direction. Then, the transition position as per FIG. 6b is firstly assumed, and finally the ventilation position as per FIG. 6a is assumed. The valve actuation sequence is the reverse of that described above.

Figure 8:
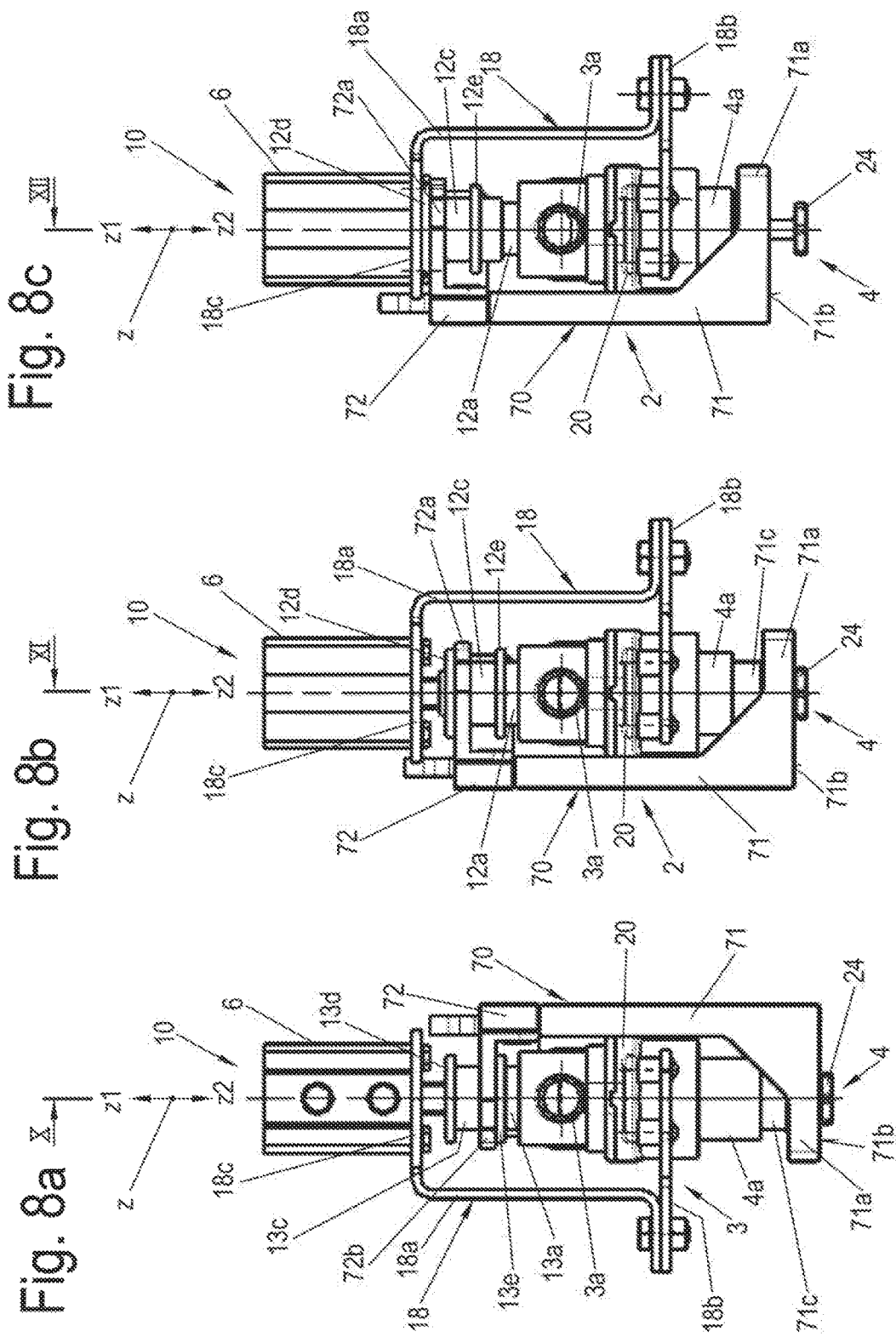
FIGS. 8a through 8c show schematic side views of a second exemplary embodiment of the safety valve device according to the invention as per FIGS. 4 and 5, in different switching positions.
Figure 9:
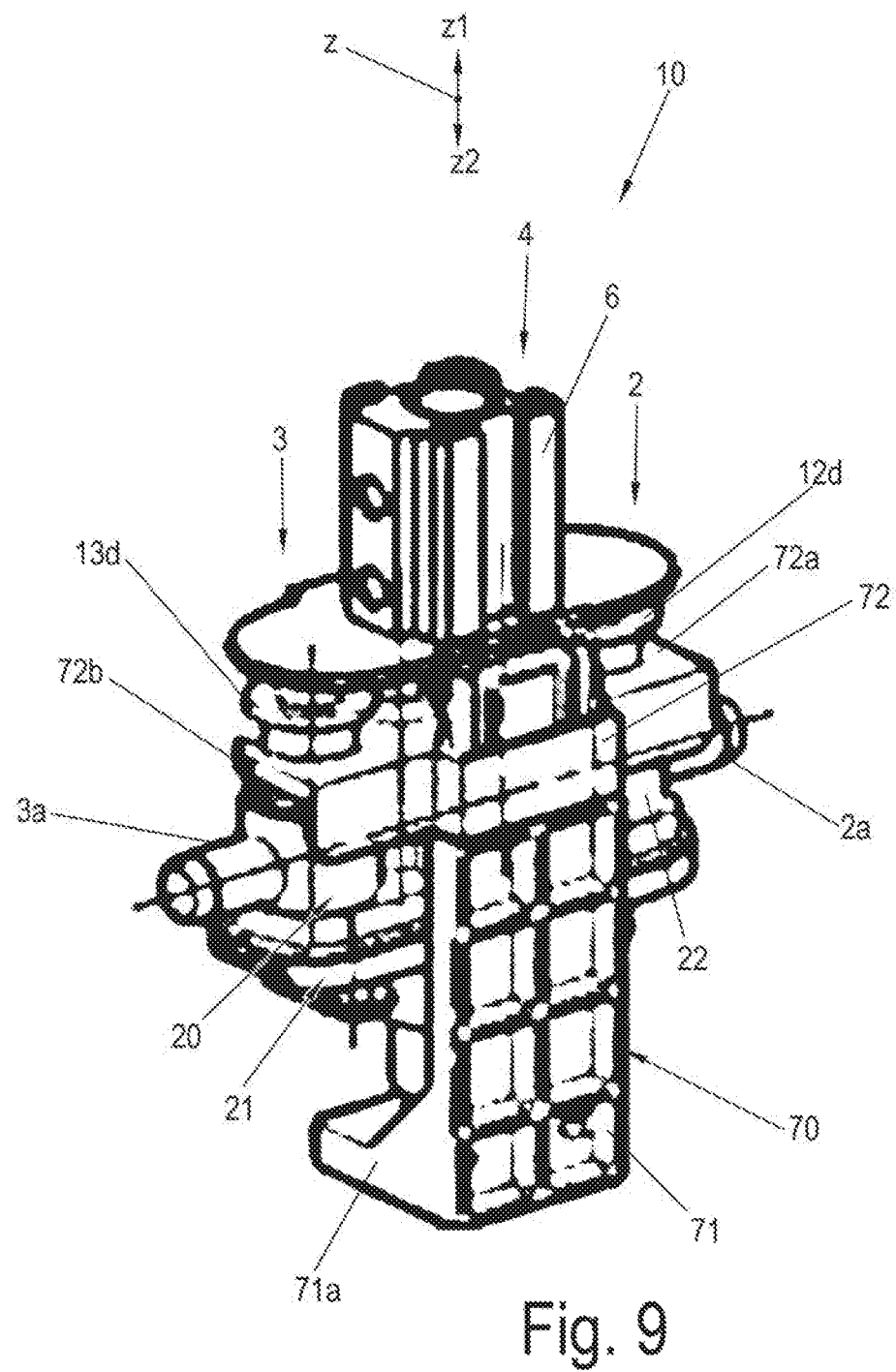
FIG. 9 shows the second exemplary embodiment of the safety valve device according to the invention as per FIGS. 8a-8c in a perspective view from the rear.
Figure 10:
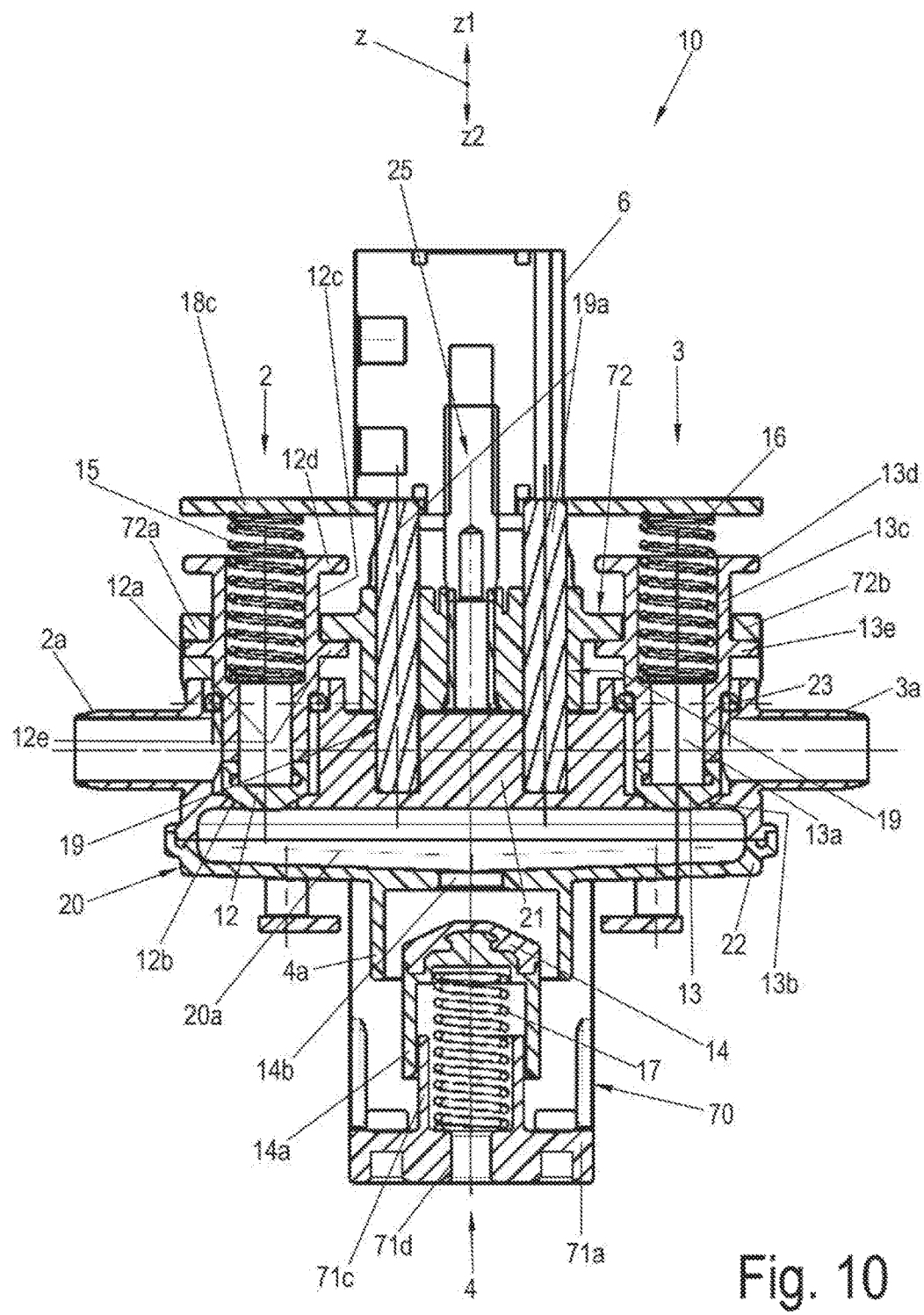
FIGS. 10 through 12 show schematic sectional views of the second exemplary embodiment of the safety valve device according to the invention as per FIGS. 8a-8c, in different switching positions.
Figure 11:
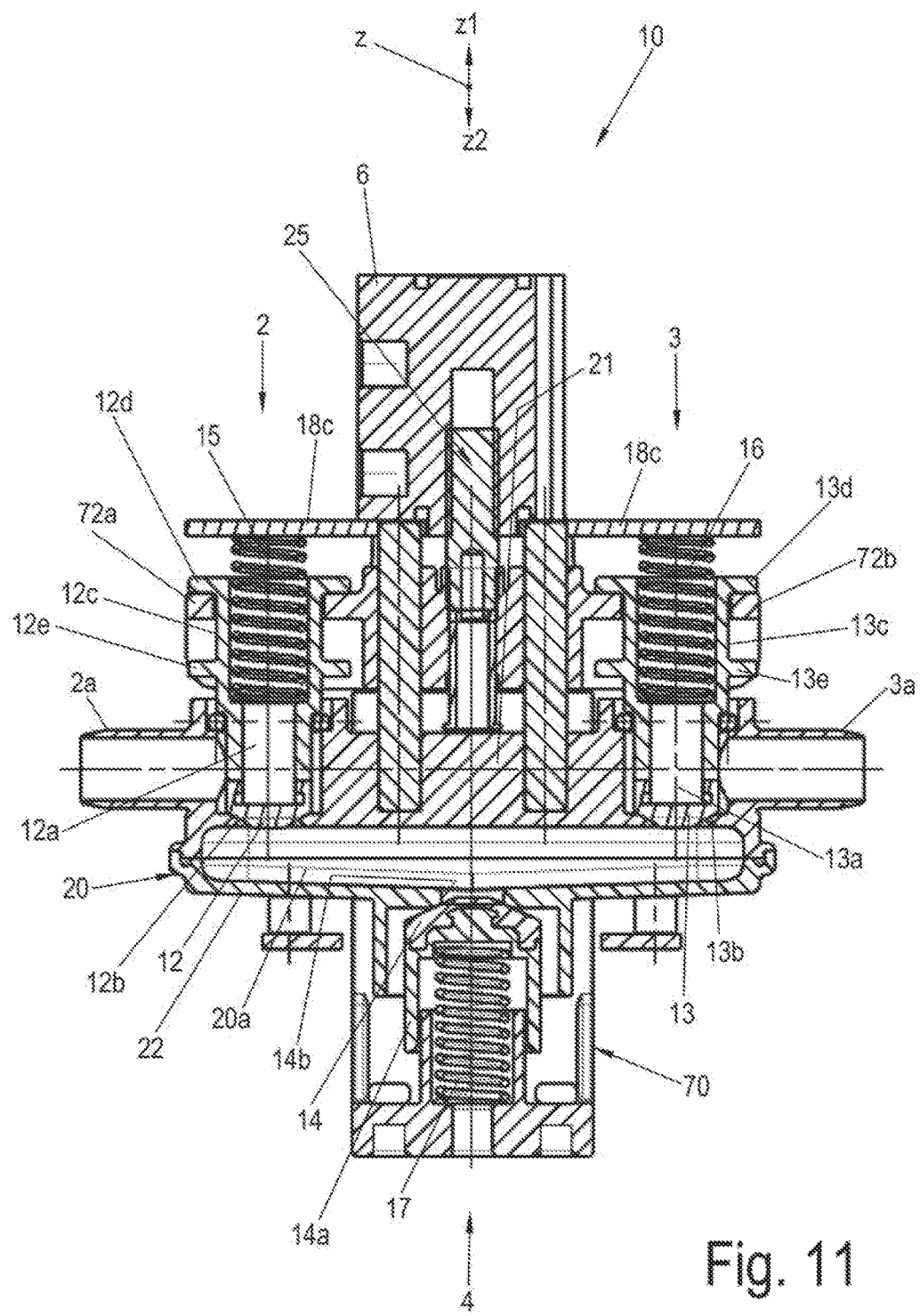
Figure 12:
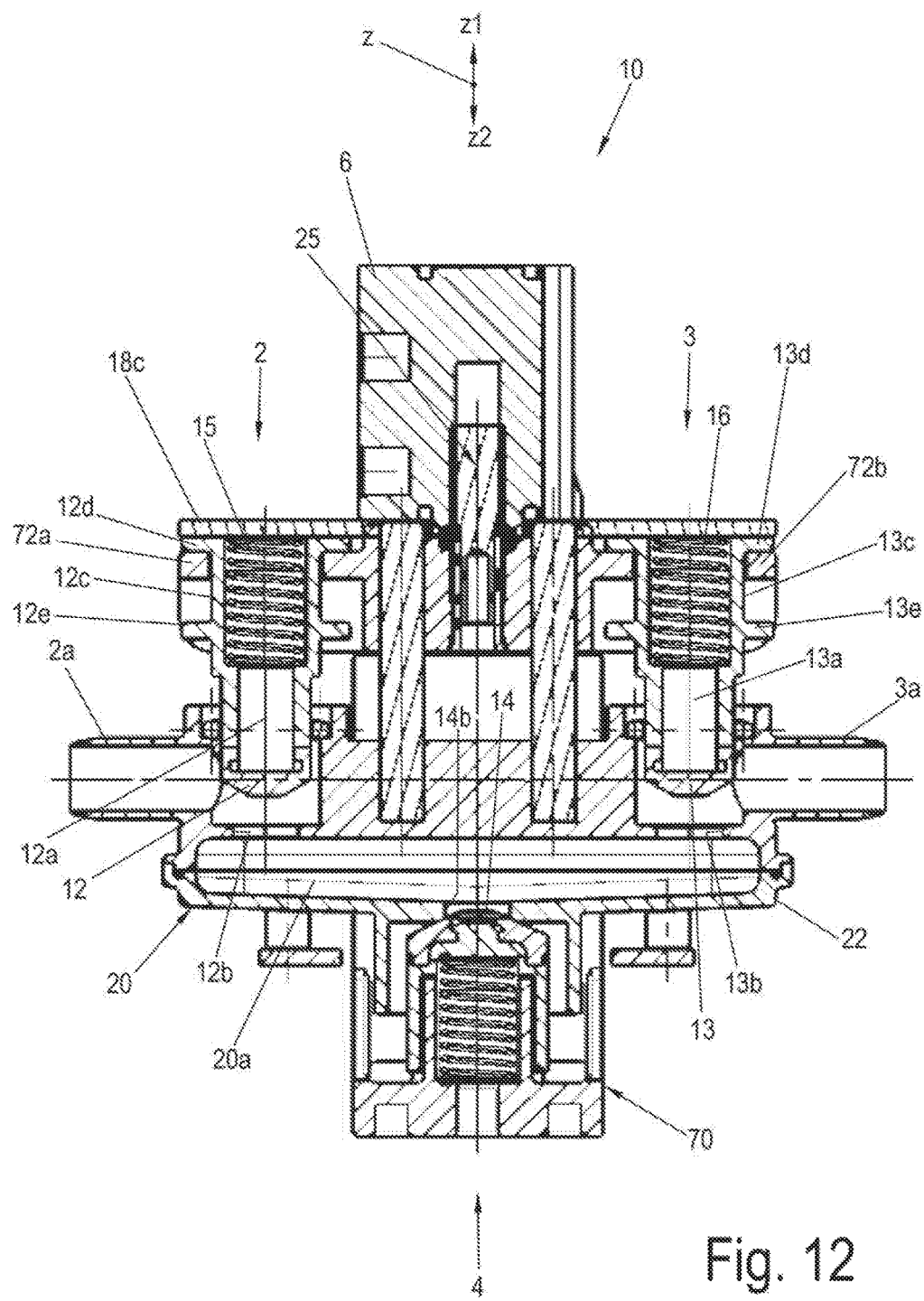

FIGS. 8a-8c show schematic side views of a second exemplary embodiment of the safety valve device 10 according to the invention as per FIGS. 4 and 5, in different switching positions. FIG. 9 shows the second exemplary embodiment of the safety valve device 10 according to the invention as per FIGS. 8a-8c in a perspective view from the rear. In this regard, FIGS. 10-12 show schematic sectional views of the second exemplary embodiment of the safety valve device 10 according to the invention as per FIGS. 8a-8c, in different switching positions.

FIG. 8a illustrates the second exemplary embodiment in a side view, in the ventilation position. In this regard, FIG. 10 shows a sectional view along line X. FIG. 8b shows a transition position, and FIG. 11 illustrates the sectional view along line XI. FIG. 8c shows the throughflow position. The associated sectional view along line XII is illustrated in FIG. 12.

In the second exemplary embodiment, the safety valve device 10 according to the invention comprises three valves 2, 3, 4, a common drive 6, a common actuator 70, valve springs 15, 16, 17, a frame 18, and a common valve housing 20 with an interior 20a.

In this second exemplary embodiment, too, the first valve 2 has the first port 2a, the second valve 3 has the second port 3a, and the third valve 4 has the third port 4a, wherein here, too, the port connectors 2b, 3b, 4b of the valves 2, 3, 4 are realized by the common valve housing 20 with the interior 20a.

As seen in FIGS. 8a though 8c, the frame 18 has two frame parts 18a and 18b which are connected to one another for example by fastening means, for example screws. An upper frame part 18a is Z-shaped, for example in the form of a punched and bent part composed of metal, and on its upper leg 18c bears the drive 6 which is for example a pneumatic cylinder. The lower leg of the upper frame part 18a is connected to the plate-shaped lower frame part 18b, which bears the valve housing 20.

Here, the valve housing 20 has an upper housing part 21 and a lower housing part 22. The housing parts 21 and 22 are connected to one another in an encircling manner. The connection must be formed in accordance with respective national regulations and standards. The connection may for example be realized by means of screws. An ultrasound welding process is also possible, though it may not satisfy USA FDA standards the joining methods and arrangements are possible within the scope of the invention. The housing parts 21 and 22 enclose an interior 20a. The upper housing part 21 has the ports 2a and 3a of the valves 2 and 3 with the associated valve seats 12b and 13b. Furthermore, the upper housing part 21 is configured as a bracket for two bar-shaped guide elements 19a of the actuator guide 19.

The first port 2a communicates with the valve seat 12b of the first valve 2. On the opposite side of the upper housing part 21, the second port 3a of the second valve 3 communicates with the associated valve seat 13b. The third port 4a with the valve seat 14b of the third valve 4 is arranged in the center of the lower housing part 22.

The first valve 2 comprises a valve element 12 with a valve shank 12a, which in this case is of hollow form, and the valve spring 15, which is inserted into the cavity of the valve shank 12a so as to extend over approximately half of the length of the valve shank 12a and which rests by way of its lower end on a shoulder in the valve shank 12a. The valve spring 15 is supported by way of the upper end on the bottom side of the upper leg 18c of the frame part 18a. The valve spring 15 is in this case a pressure spring.

The valve shank 12a is held, so as to be guided in a longitudinally displaceable manner, in the upper housing part 21, and is sealed off with respect to the upper housing part 21 by means of a seal 23, for example an O-ring. The seal 23 is arranged in a recess of the upper housing part 21.

The upper region of the valve shank 12a, into which the valve spring 15 is inserted, is referred to as connection portion 12c and is defined axially by a collar-like actuation stop 12d on the upper end of the valve shank 12a and by a rest stop 12e arranged at a distance below the actuation stop. The stops 12d and 12e are fixedly connected to the valve shank 12a. The function of the stops will be explained in more detail below. The connection portion 12c is coupled to the common actuator 70 via an actuation portion 72a, which will also be discussed in more detail further below.

The second valve 3 likewise comprises a valve element 13 with a valve shank 13a, which is of hollow form, and the valve spring 16, which rests in the cavity of the valve shank 13a in the same way as the valve spring 15 in the valve shank 12a of the first valve 2. The valve spring 16 is also supported by way of the upper end on the bottom side of the upper leg 18c of the frame 18. In this case, too, the valve spring 16 is a pressure spring.

Like the valve shank 12a, the valve shank 13a is held, so as to be guided in a longitudinally displaceable manner, in the upper housing part 21, and is sealed off with respect to the upper housing part 21 by means of a seal 23, for example an O-ring. The seal 23 is arranged in a recess of the upper housing part 21.

The upper region of the valve shank 13a, into which the valve spring 16 is inserted, is referred to as connection portion 13c and is defined axially by a collar-like actuation stop 13d on the upper end of the valve shank 13a and by a rest stop 13e arranged at a distance below the actuation stop. The stops 13d and 13e are fixedly connected to the valve shank 13a. The function of the stops will be explained in more detail below. The connection portion 13c is coupled to the common actuator 70 via an actuation portion 72b, which will also be discussed in more detail further below.

The valve elements 12 and 13 are formed in the manner of valve disks which are fastened in each case to one end of the associated valve shank 12a, 13a and which, by way of their front sides, interact with the respective valve seat 12b, 13b in the upper housing part 21 from the outside. Here, the front side is to be understood to mean that side of the valve element 12, 13 which is situated opposite the respective valve shank 12a, 13a.

Here, the third valve 4 comprises a valve element 14 with a valve shank 14a, which is of hollow form, and the valve spring 17 which is inserted into the cavity of the valve shank 13a and which rests by way of its upper end on a base of the valve shank 14a. The base of the valve shank 14a is connected to the valve element 14. Here, the valve element 14 is arranged on the bottom side of the lower housing part 22 of the valve housing 20 and points in the z direction toward the other valve elements 12 and 13. By way of its lower end, the valve spring 17 is inserted into a receptacle 71c of an actuation portion 71a of the common actuator 70 and is supported on the base of the receptacle 71c. The valve shank 14a engages around the receptacle 71c. The valve shank 14a is guided, so as to be longitudinally displaceable in the z direction, by the receptacle 71c and is held by the latter in a way which is not illustrated in any more detail. In this case, the valve spring 17 is a pressure spring.

In this exemplary embodiment, the common actuator 70 comprises two parts which are connected to one another for assembly purposes. A first actuation element 71 is arranged at the bottom, and a second actuation element 72 forms the upper part of the actuator 70. The first actuation element 71 is of L-shaped form. A short leg is formed by the actuation portion 71a, which has a downwardly pointing surface 71b and which is fixedly connected to the long leg extending in the z direction and which is additionally stiffened by means of triangular side portions connected to the short leg and to the long leg. The rear sides of the parts of the common actuator 70 are furthermore stiffened by means of ribs. This is shown in FIG. 9 by way of example for the rear sides of the first and second actuation elements 71 and 72. This is also easily conceivable for the surface 71b of the bottom side of the actuation portion 71a. The common actuator 70 may be produced from plastics injection-molded parts, from punched and bent parts composed of metal, or from combinations of these.

The second actuation element 72 is coupled to the drive 6 in a way which is not illustrated in any more detail. An actuator spring (not shown here) with the same function as in the first exemplary embodiment as per FIGS. 6a-6c is arranged within the drive 6. A sensor device 25 (not explained in any more detail) for detecting the respective switching position of the safety valve device 10 is arranged in the region of the coupling. The sensor device 25 may for example be a constituent part of the drive 6. Only one sensor device 25 is necessary, because in the respective switching position, the valves 2, 3 and 4 are positively closed.

A safety position is provided in which the drive 6 is deployed in the z2 direction. This may be effected for example by the actuator spring or other biasing device. Here, the first valve 2 and the second valve 3 are closed, and the third valve 4 is open. The safety position corresponds to the ventilation position.

Furthermore, the second actuation element 72 is provided, in its central portion, with two guide bores through which the bar-like guide elements 19a of the actuator guide 19 extend. In this way, the second actuation element 72 and thus the common actuator 70 are guided and held so as to be longitudinally displaceable in the z direction.

The actuation portion 72a is attached to the central portion of the second actuation element 72 on one side (on the left-hand side in FIGS. 10-12), and the actuation portion 72b is attached to the central portion on the right-hand side. The actuation portions 72a and 72b are for example of fork-shaped form and engage in each case around the associated connection portion 12c and 13c of the respective valve 2 and 3. In the ventilation position illustrated in FIGS. 8a and 10, the actuation portion 72a rests on the upper side of the rest stop 12e of the first valve 2. In this case, the actuation portion 72b rests on the upper side of the rest stop 13e of the second valve 3.

In the ventilation position shown in FIGS. 8a and 10, the valve element 12 of the first valve 2 and the valve element 13 of the second valve 3 are pressed into the associated valve seat 12b and 13b by their respective valve springs 15, 16. The valves 2 and 3 are thus closed.

If the drive 6 is now activated in order to switch the safety valve device 10 from the ventilation position into the throughflow position, the common actuator 70 is moved by the drive 6 in the z1 direction. Here, firstly, the valve element 14 of the third valve 4 is pressed against the valve seat 14b. The third valve 4 is thus closed. (FIG. 11.) At the same time, the fork-shaped actuation portions 72a and 72b move upward on the respective connection portions 12c and 13c in the z1 direction, wherein the valve shanks 12a and 13a are not adjusted because the actuation portions 72a and 72b move away from the rest stops 12e and 13e. In the transition position illustrated in FIGS. 8b and 11, the third valve 4 is closed. The first valve 2 and the second valve 3 are likewise closed. The actuation portion 72a is now in contact with the bottom side of the actuation stop 12d of the first valve 2, and the actuation portion 72b is in contact with the bottom side of the actuation stop 13d of the second valve 3. Thus, in the transition position, no air can pass into the interior 20a.

The common actuator 70 is moved further in the z1 direction by the drive 6 in order to assume the throughflow position. Here, the valve shank 12a of the first valve 2 is also moved in the z1 direction, by way of the actuation stop 12d, by the actuation portion 72a. Likewise, the actuation portion 72b moves the valve shank 13a of the second valve 3 in the z1 direction. As a result, the first valve 2 and the second valve 3 are opened. The valve spring 17 of the third valve 4, which remains closed, is compressed further and presses the valve element 14 more intensely into the valve seat 14b. The throughflow position is shown in FIGS. 8c and 12.

The overall stroke of the common actuator 70 is composed of two ranges. In the first range, the actuator 70 is adjusted upward in the z1 direction and closes the third valve 4. During the phase, the actuation portions 72a and 72b move along the connection portions 12c and 13c of the valve shanks 12a and 13a. Only when the third valve 4 is closed in the transition position are the first valve 2 and the second valve 3 opened in a second range of the stroke of the actuator 70.

The first range of the stroke of the actuator 70 can be predefined by the distance between the top side of the actuation portions 72a, 72b and the bottom side of the actuation stops 12d, 13d.

The position of the valve shank 14a with the valve element 14 of the third valve 4 in relation to the top side of the actuation portion 71a, or the preload ("bias") of the valve spring 17 of the third valve 4, can be adjusted in the z direction by means of an adjusting element 24, for example a screw in a bore 71d with a thread.

FIG. 13 shows a schematic perspective view of a safety valve arrangement 26. The safety valve arrangement 26 has in this case four safety valve devices 10 according to the second exemplary embodiment. The four safety valve devices 10 are mounted, with their longitudinal sides parallel to one another, on a support unit 27. The arrangement can be exchanged in its entirety for maintenance or exchange purposes, for example, and thus facilitates maintenance work. In this regard, the safety valve arrangement 26 may also be formed in the manner of a drawer. The safety valve arrangement 26 which is shown is merely an example. Other arrangements with different unit quantities and with different designs are self-evidently also possible.

Figure 15:
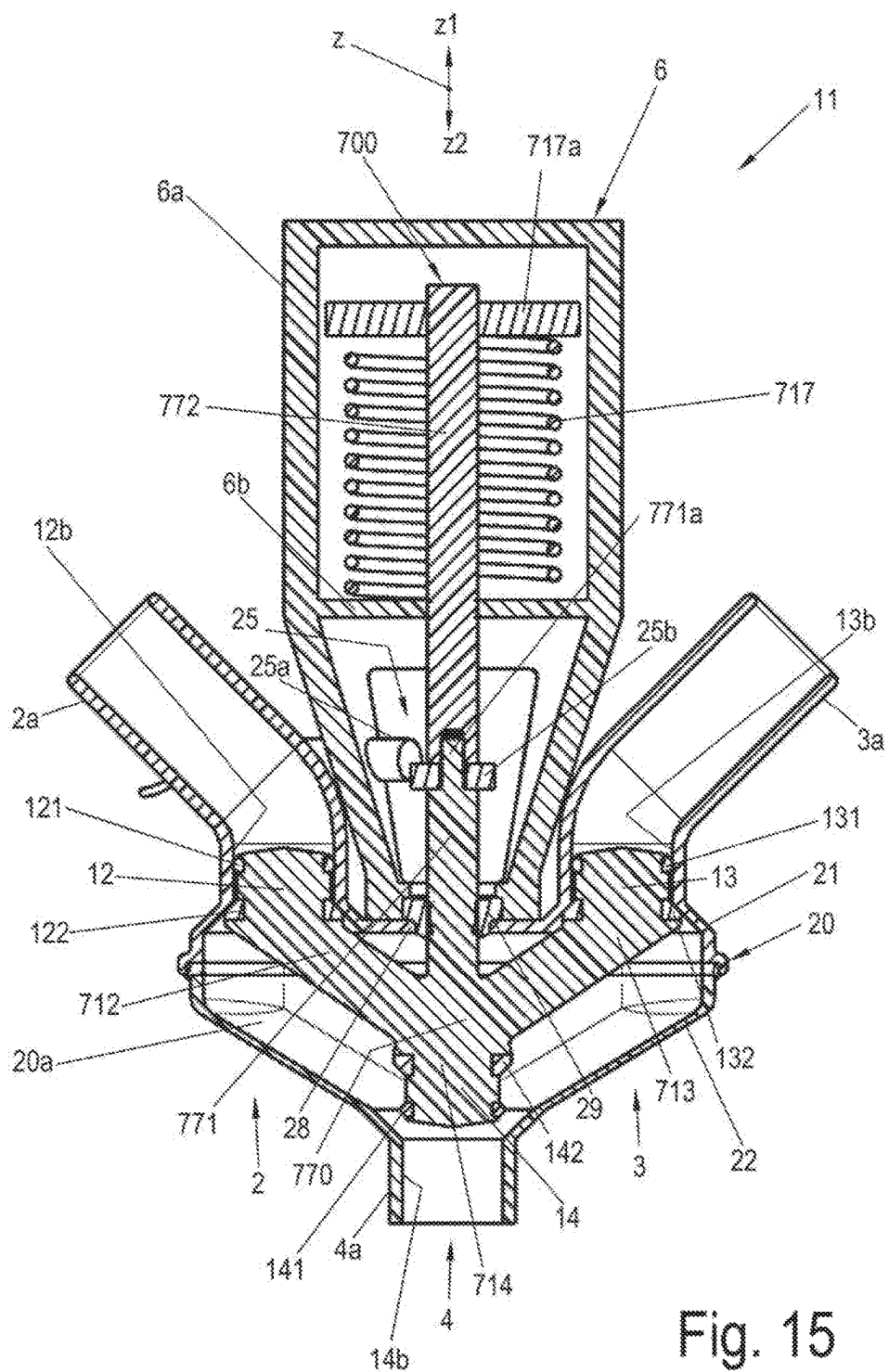
FIGS. 15 through 17 show schematic sectional views of the third exemplary embodiment of the safety valve device according to the invention as per FIG. 14, in different switching positions.
Figure 16:
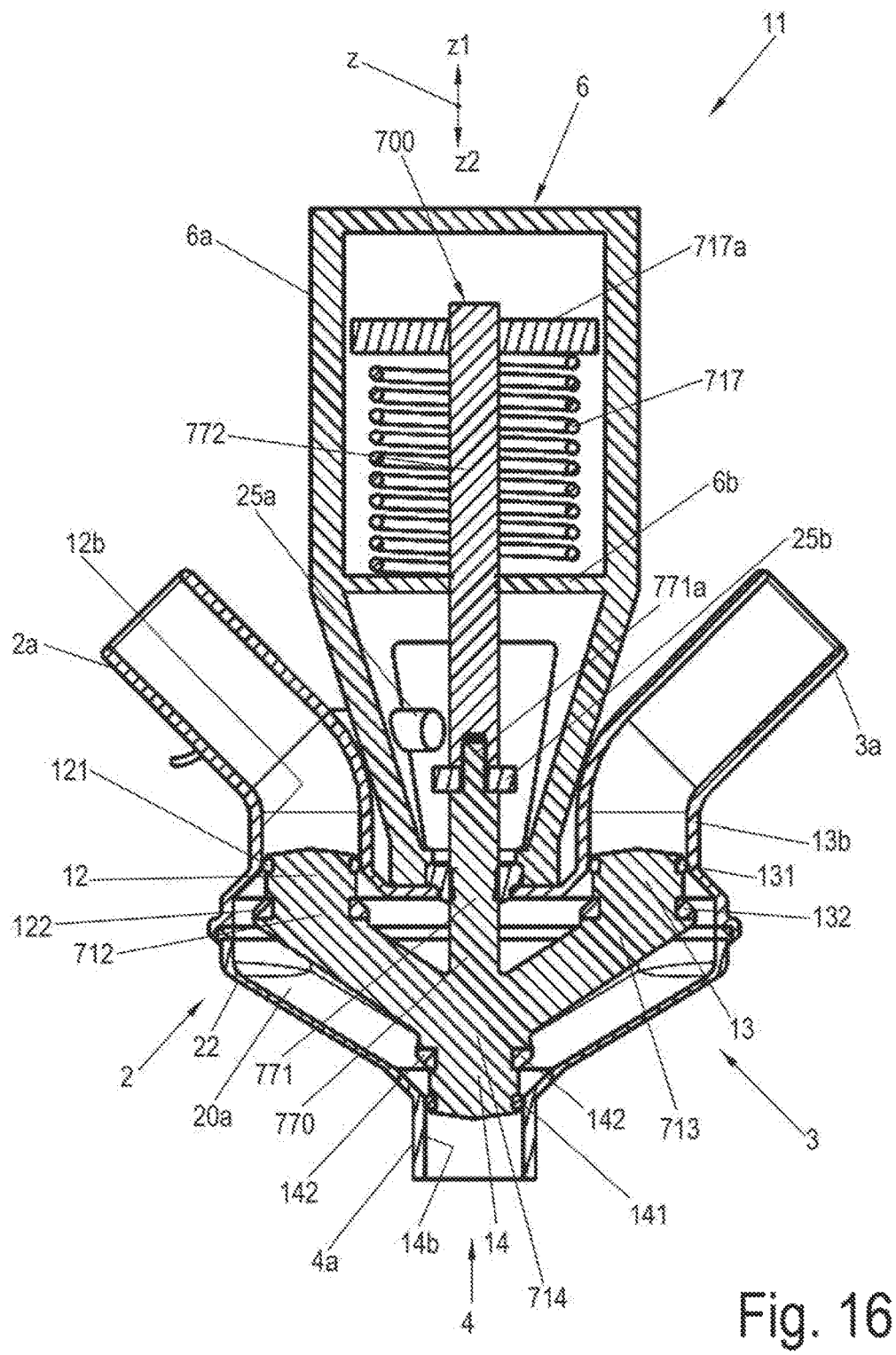
Figure 17:
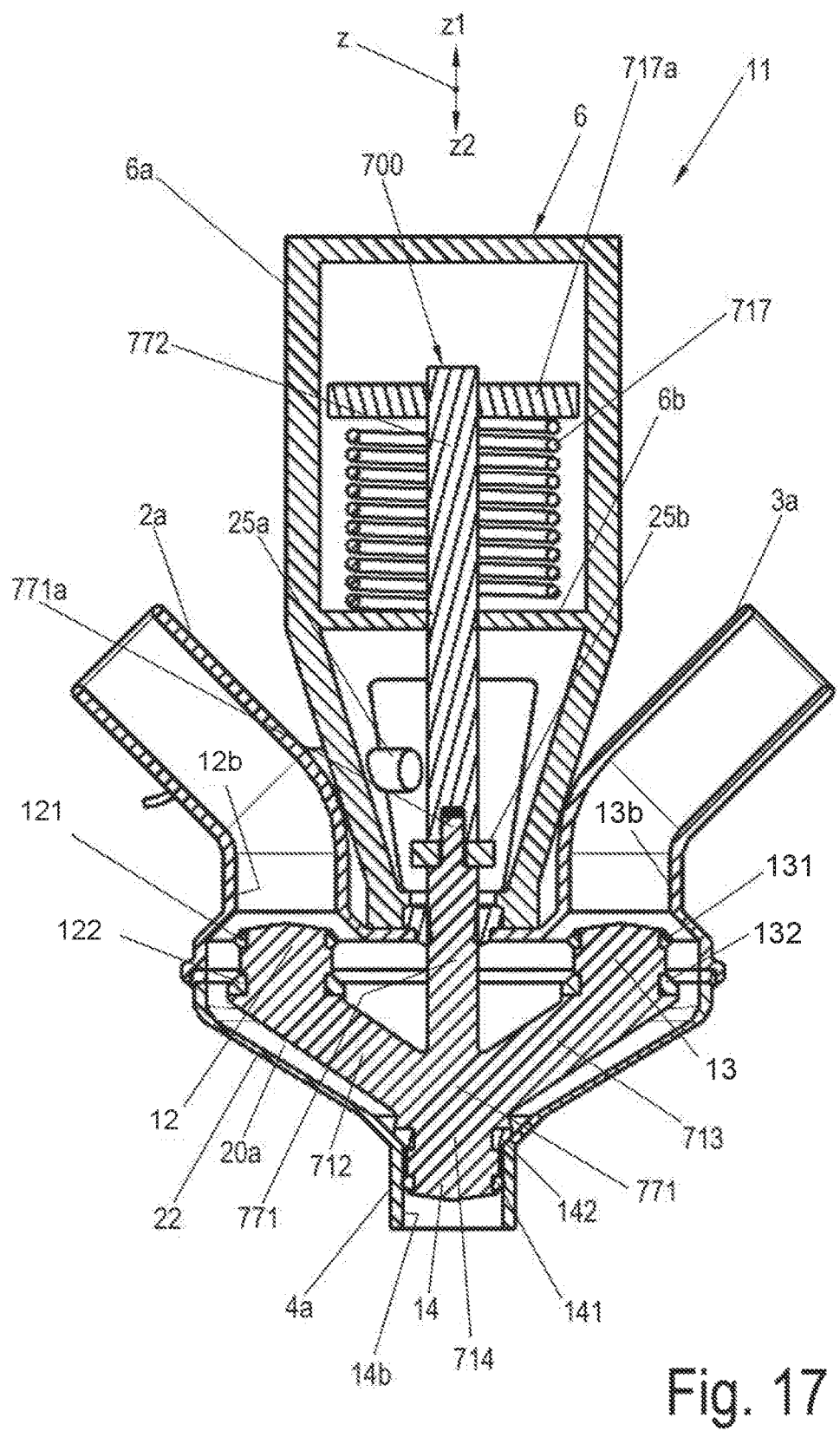

FIG. 14 shows a schematic, perspective and partially sectional view of a third exemplary embodiment of the safety valve device 11 according to the invention as per FIGS. 4 and 5. FIGS. 15-17 show schematic sectional views of the third exemplary embodiment of the safety valve device 11 according to the invention as per FIG. 14, in different switching positions.

FIG. 15 shows the ventilation position of the safety valve device 11, wherein the ventilation position is simultaneously also the safety position of the safety valve device 11. FIG. 16 shows the transition position, and FIG. 17 illustrates the throughflow position.

The safety valve device 11 according to the third exemplary embodiment comprises the first valve 2, the second valve 3, the third valve 4, a common drive 6, a common actuator 700, a common valve spring 717, and a common valve housing 20 with an interior 20a.

In the third exemplary embodiment, it is also the case that the first valve 2 has the first port 2a, the second valve 3 has the second port 3a, and the third valve 4 has the third port 4a. It is likewise the case here that the port connectors 2b, 3b, 4b of the valves 2, 3, 4 are realized by the common valve housing 20 with the interior 20a.

The drive 6 is arranged in a hollow circular cylindrical drive housing 6a with a base 6b. The drive 6 may for example be in the form of a pneumatic cylinder, this not being illustrated in any more detail here. The drive housing 6a is connected via a conical hollow part to the top side of the upper housing part 21 of the valve housing 20. The conical hollow part is in this case formed in one piece with the drive housing 6a, wherein a connection portion on the bottom side of the conical hollow part has a smaller diameter than a connection portion at the connection point of the conical hollow part to the circular cylindrical drive housing 6a. Thus, the space between the ports 2a and 3a is utilized, wherein the distance between the ports can be kept small.

The upper housing part 21 is connected at its left-hand end to the first port 2a of the first valve 2 and at its right-hand end to the second port 3a of the second valve 3.

The lower housing part 22 of the valve housing 20 is connected to the upper housing part 21 in a similar manner to that in the second exemplary embodiment as per FIGS. 8a-12, for example by means of screws, as already explained above. In the third exemplary embodiment, the lower housing part 22 is formed so as to be funnel-shaped in the downward direction, wherein the third port 4a of the third valve 4 is arranged at the lower point and is connected to the lower housing part 22.

The third port 4a points downward, whereas the first port 2a points upward and to the left at approximately 45° with respect to an imaginary horizontal line. Mirror-symmetrically with respect to the first port 2a, the second port 3a points upward and to the right at approximately 45° with respect to an imaginary horizontal line. The ports 2a, 3a, 4a communicate with the interior 20a of the valve housing 20. At their connection points to the valve housing 20, all of the ports 2a, 3a, 4a are provided with a circular cylindrical portion. The circular cylindrical portion of the first port 2a forms a valve seat 12b of the first valve 2, the circular cylindrical portion of the second port 3a forms a valve seat 13b of the second valve 3, and the circular cylindrical portion of the third port 4a forms a valve seat 14b of the third valve 3.

The first valve 2 comprises a valve element 12 with a secondary sealing element 121 and with a main sealing element 122. In this embodiment, the valve element 12 has a cylindrical body, on the outer circumference of which the sealing elements 121, 122 are mounted in corresponding receptacles. The secondary sealing element 121 is arranged on the upper end of the valve element 12, and the main sealing element 122 is mounted on the valve element 12 at a distance below the secondary sealing element 121.

The valve element 12 of the first valve 2 interacts with the circular cylindrical valve seat 12b in the first port 2a and, depending on the position of the first valve 2, separates the first port 2a from, or connects the first port 2a to, the interior 20a of the valve housing 20. Here, the valve element 12 is guided in the valve seat 12b so as to be displaceable in the z direction.

The second valve 3 is constructed in the same way as the first valve 2 and comprises a valve element 13 with a secondary sealing element 131 and a main sealing element 132. The valve element 13 also has a cylindrical body, on the outer circumference of which the sealing elements 131, 132 are mounted in corresponding receptacles. The secondary sealing element 131 is arranged on the upper end of the valve element 13, and the main sealing element 132 is mounted on the valve element 13 at a distance below the secondary sealing element 131.

The valve element 13 of the first valve 3 interacts with the circular cylindrical valve seat 13b in the second port 3a and, depending on the position of the second valve 3, separates the first port 3a from, or connects the first port 3a to, the interior 20a of the valve housing 20. Here, the valve element 13 is guided in the valve seat 13b so as to be displaceable in the z direction.

Here, the first valve element 12 and the second valve element 13 are arranged in parallel.

The third valve 4 is also constructed in the same way as the first valve 2 and the second valve 3 and comprises a valve element 14 with a secondary sealing element 141 and with a main sealing element 142. The valve element 14 also has a cylindrical body, on the outer circumference of which the sealing elements 141, 142 are mounted in corresponding receptacles. Here, the secondary sealing element 141 is arranged on the lower end of the valve element 14, and the main sealing element 142 is mounted on the valve element 14 at a distance above the secondary sealing element 141.

The valve element 14 of the third valve 4 interacts with the circular cylindrical valve seat 14b in the third port 4a and, depending on the position of the third valve 4, separates the third port 4a from, or connects the third port 4a to, the interior 20a of the valve housing 20. Here, the valve element 14 is guided in the valve seat 14b so as to be displaceable in the z direction.

In this exemplary embodiment, the secondary sealing elements 121, 131, 141 and the main sealing elements 122, 132, 142 are separate components. They may however also be sealing portions, for example beads, lips etc., of a common body with which they are formed in one piece, this not being illustrated but being easily conceivable.

Whereas the valve elements 12 and 13 point upward, the third valve element 14 is arranged so as to point downward. The central axes of all of the valve elements 12, 13, 14 run substantially parallel. The central axes of the valve seats 12b, 13b, 14b are also arranged parallel to one another. Each valve element 12, 13, 14 is arranged centrally in the respectively associated valve seat 12b, 13b, 14b.

All of the valve elements 12, 13, 14 are connected to the common actuator 700 and can be adjusted with the latter in the z direction.

The common actuator 700 comprises an actuation body 770, two actuation elements 771, 772, and three actuation arms 712, 713, 714.

The actuation arms 712 and 713 are attached to the actuation body 770 so as to point laterally upward and to the left and upward and to the right, wherein the actuation arm 714 is attached to the actuation body 770 so as to extend vertically downward in the z direction. The valve element 12 of the first valve 2 is attached to the free end of the actuation arm 712. In the same way, the valve element 13 of the second valve 3 is attached to the free end of the actuation arm 713. Also, the free end of the actuation arm 714 is connected to the valve element 14 of the third valve 4. Here, all of the central axes of the valve elements 12, 13, 14 are arranged parallel to one another and to a central axis of the first actuation element 771 of the actuator 700.

The first actuation element 771, of bar-shaped form, is attached to the top side of the actuation body 770 and extends upward in the z1 direction through an opening 28 in the upper wall of the upper housing part 21, through a sealed-off bearing 29, as far as approximately the middle of the conical hollow part of the drive housing 6.

The upper end of the first actuation element 771 is of peg-like form and is provided with an annular sensor actuator 25b of a sensor device 25. The sensor actuator 25b is fixedly connected to the first actuation element 771 and interacts with a sensor 25a of the sensor device 25 in order to detect the switching position of the safety valve device 11. Here, the sensor actuator 25b may for example be an annular magnet.

The peg-like end of the first actuation element 771 is received in a corresponding receptacle of a lower end of the second, likewise bar-shaped actuation element 772 of the actuator 700, and connects the first actuation element 771 and the second actuation element 772.

The second actuation element 772 extends in the z1 direction through the base 6b of the drive housing 6 and through the major part of the drive housing 6. The valve spring disk 717a is fixedly attached to the upper end of the second actuation element 772. The common valve spring 717 is arranged around the second actuation element 772 and is supported by way of its lower end on the base 6b of the drive housing 6 and by way of its upper end on the bottom side of the valve spring disk 717a with a predefinable preload ("bias").

Here, the valve spring 717 is a pressure spring and presses the common actuator 700 upward in the z1 direction by axial exertion of force on the valve spring disk 717a.

In this way, the safety position or ventilation position of the safety valve arrangement 11, illustrated in FIG. 15, is assumed. In the ventilation position, the first valve 2 and the second valve 3 are closed, wherein the third valve 4 is open. The closed position of the first valve 2 is realized by virtue of the fact that the valve element 12 is arranged within the valve seat 12b, wherein the secondary sealing element 121 and main sealing element 122 interact with the valve seat 12b and separate the first port 2a from the interior 20a of the valve housing 20. The interaction of the secondary sealing element 121 and of the main sealing element 122 with the valve seat 12b consists in that the secondary sealing element 121 bears sealingly by way of its encircling seal lip 31 (see FIG. 22) or seal surface, and the main sealing element 122 bears sealingly by way of its encircling seal surface 30 (see also FIG. 22), against the inner surface of the valve seat 12b.

In the same way, the closed position of the second valve 3 is realized by virtue of the fact that the valve element 13 is arranged within the valve seat 13b, wherein the secondary sealing element 131 and main sealing element 132 interact with the valve seat 13b and separate the first port 3a from the interior 20a of the valve housing 20. The interaction of the secondary sealing element 131 and of the main sealing element 132 with the valve seat 13b consists in that the secondary sealing element 131 bears sealingly by way of its encircling seal lip 31 (see FIG. 22) or seal surface, and the main sealing element 132 bears sealingly by way of its encircling seal surface 30 (see also FIG. 22), against the inner surface of the valve seat 13b.

The valve element 14 of the third valve 4, with its sealing elements 141, 142, is pulled all the way out of the valve seat 14b, wherein the third port 4a is connected to the interior 20a of the valve housing 20. For the closed position of the third valve 4, it is also true that the interaction of the secondary sealing element 141 and of the main sealing element 142 with the valve seat 14b consists in that the secondary sealing element 141 bears sealingly by way of its encircling seal lip 31 (see FIG. 22) or seal surface, and the main sealing element 142 bears sealingly by way of its encircling seal surface 30 (see also FIG. 22), against the inner surface of the valve seat 14b.

The construction of the valve elements 12, 13, 14 with the associated sealing elements 121, 122; 131, 132; 141, 142 will be explained in more detail below in conjunction with FIG. 22.

In the ventilation position, the ventilation position is detected by means of the sensor device 25 such that the sensor actuator 25b interacts with the sensor 25a, wherein the sensor 25a, for example a Hall sensor, produces a corresponding electrical signal, which need not be explained in any more detail.

When the safety valve device 11 is actuated in order to assume the throughflow position proceeding from the ventilation position, the common actuator 700 is adjusted by the drive 6 in the z2 direction counter to the preload ("bias") force of the common valve spring 717. Here, the transition position illustrated in FIG. 16 is firstly passed through.

The sensor actuator 25b is outside the range of the sensor 25a, and the latter thus no longer generates a signal.

In the transition position, the common actuator 700 moves the actuation body 770, and the actuation arms 712, 713, 714 attached thereto, downward in the z2 direction. Here, it is firstly the case that the main sealing elements 122, 132 of the first and second valves 2, 3 pass out of the respective valve seat 12b, 13b into the interior 20a of the valve housing, wherein however the secondary sealing elements 121, 131 of the first and second valves 2, 3 remain in the respective valve seat 12b, 13b and continue to close the respective valve 2, 3.

Here, at the same time, the secondary sealing element 141 of the third valve 4 enters the associated valve seat 14b and thus also closes the third valve 4.

Thus, in the transition position, all of the valves 2, 3, 4 are closed.

When the throughflow position shown in FIG. 17 is assumed, the secondary sealing elements 121, 131 of the first and second valves 2, 3 have also moved out of the respective valve seats 12b, 13b. As a result, the first valve 2 and the second valve 3 are open. The secondary sealing element 141 of the third valve 4 has been moved further into the valve seat 14b in the z2 direction. At the same time, the main sealing element 142 of the third valve 4 is also in contact with the inner wall of the valve seat 14b of the third valve 4. Thus, the third valve 4 remains closed in the throughflow position.

In FIGS. 15-17, the transitions between the ports 2a, 3a, 4a and the housing walls of the valve housing 20 are formed in each case with a chamfer against which the outer surface of the respective main sealing element 122, 132, 142 bears. Other configurations are self-evidently possible and will be explained in more detail below.

Through the arrangement of in each case two sealing elements 121, 122; 131, 132; 141, 142 spaced apart axially from one another, the formation of the transition position is possible in a simple manner. Thus, in the transition position, no air can pass into the interior 20a.

Figure 18:
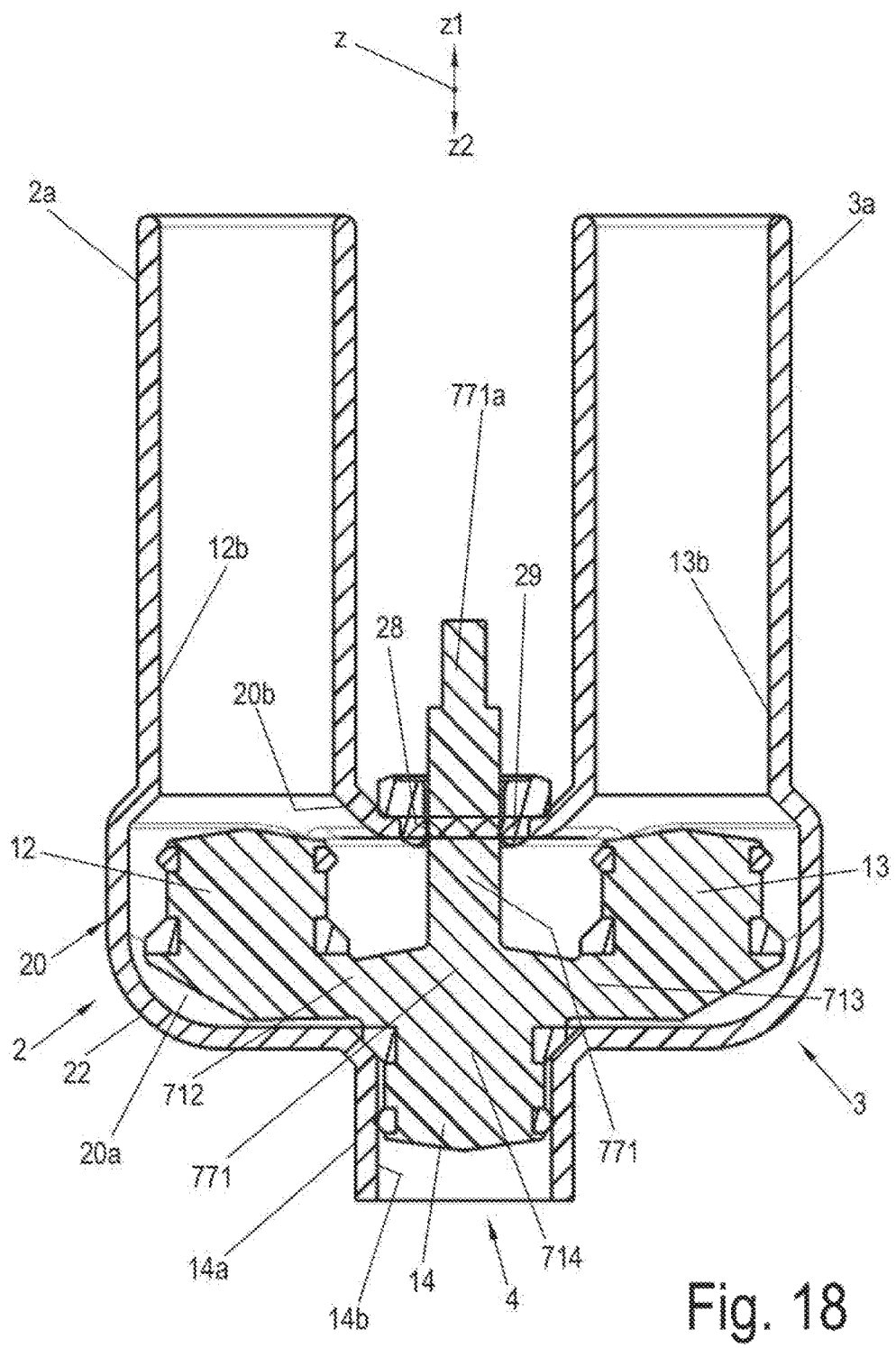
FIGS. 18 through 20 show schematic sectional views of variants of the third exemplary embodiment of the safety valve device according to the invention as per FIG. 14.
Figure 19:
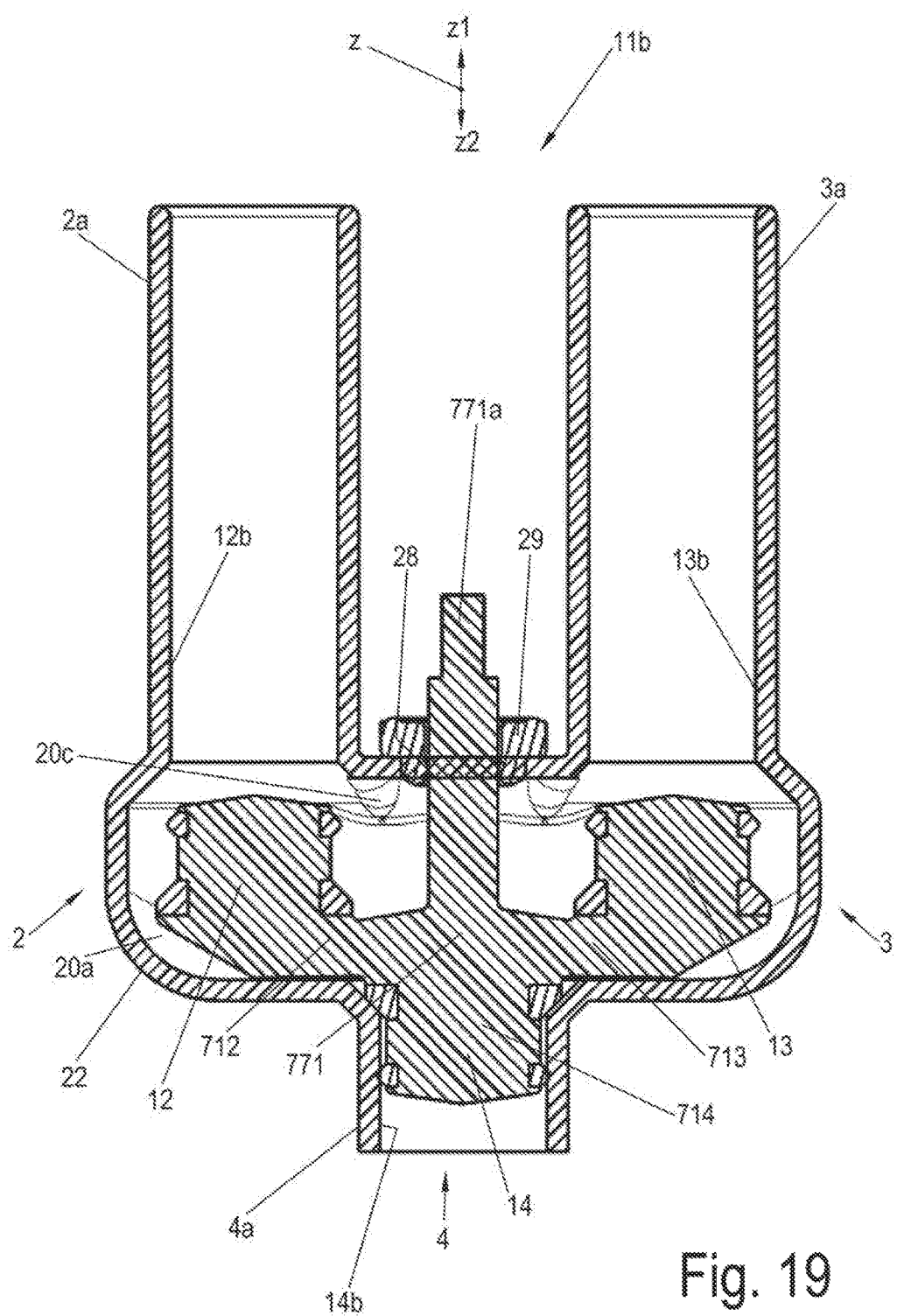
Figure 20:
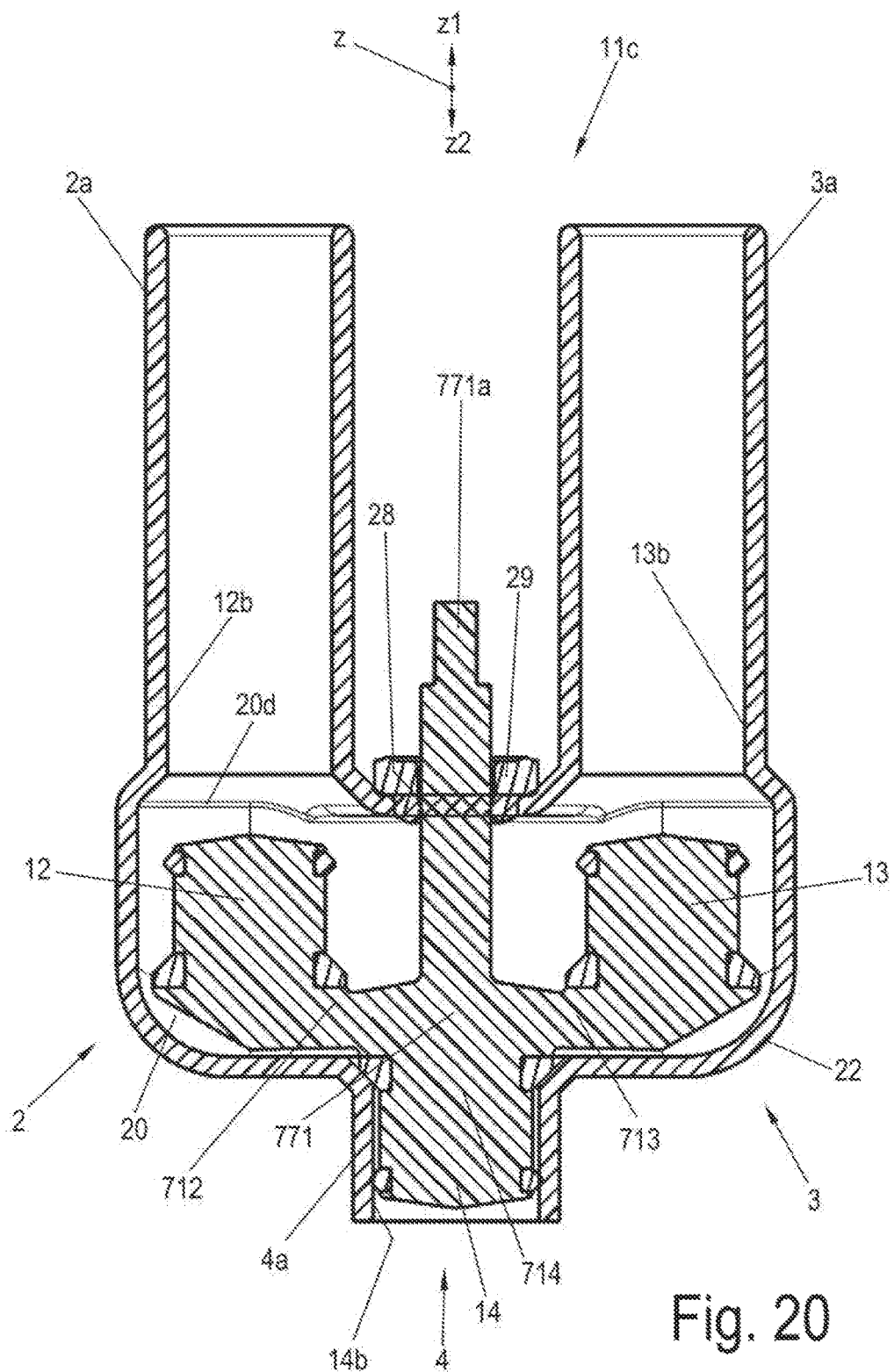

FIGS. 18-20 illustrate schematic sectional views of variants of the third exemplary embodiment of the safety valve device 11 according to the invention as per FIG. 14.

In the variant of the safety valve device 11a as per FIG. 18, the ports 2a and 3a are arranged parallel to one another and to the central axis of the first actuation element 771. The transitions 20b between the ports 2a, 3a, 4a and the housing walls of the valve housing 20 are in this case formed in each case with a chamfer. The actuation arms 712 and 713 are arranged substantially horizontally.

In the variant of the safety valve device 11b as per FIG. 19, the ports 2a and 3a are also arranged parallel to one another and to the central axis of the first actuation element 771. The transitions between the ports 2a, 3a, 4a and the housing walls of the valve housing 20 have an internal structure 20c which is of particularly streamlined form for the medium flowing through. The actuation arms 712 and 713 are arranged substantially horizontally, this also being referred to as a barbell shape.

Finally, FIG. 20 shows a variant of the safety valve device 11c in which the ports 2a and 3a are arranged parallel to one another and with a very small spacing to one another and to the central axis of the first actuation element 771. The transitions between the ports 2a, 3a, 4a and the housing walls of the valve housing 20 have an internal structure 20d which is of particularly streamlined form for the medium flowing through. The sealing elements 12, 13, 14 have smaller diameters than in the preceding variants, and are formed so as to be slightly longer axially.

Figure 21:
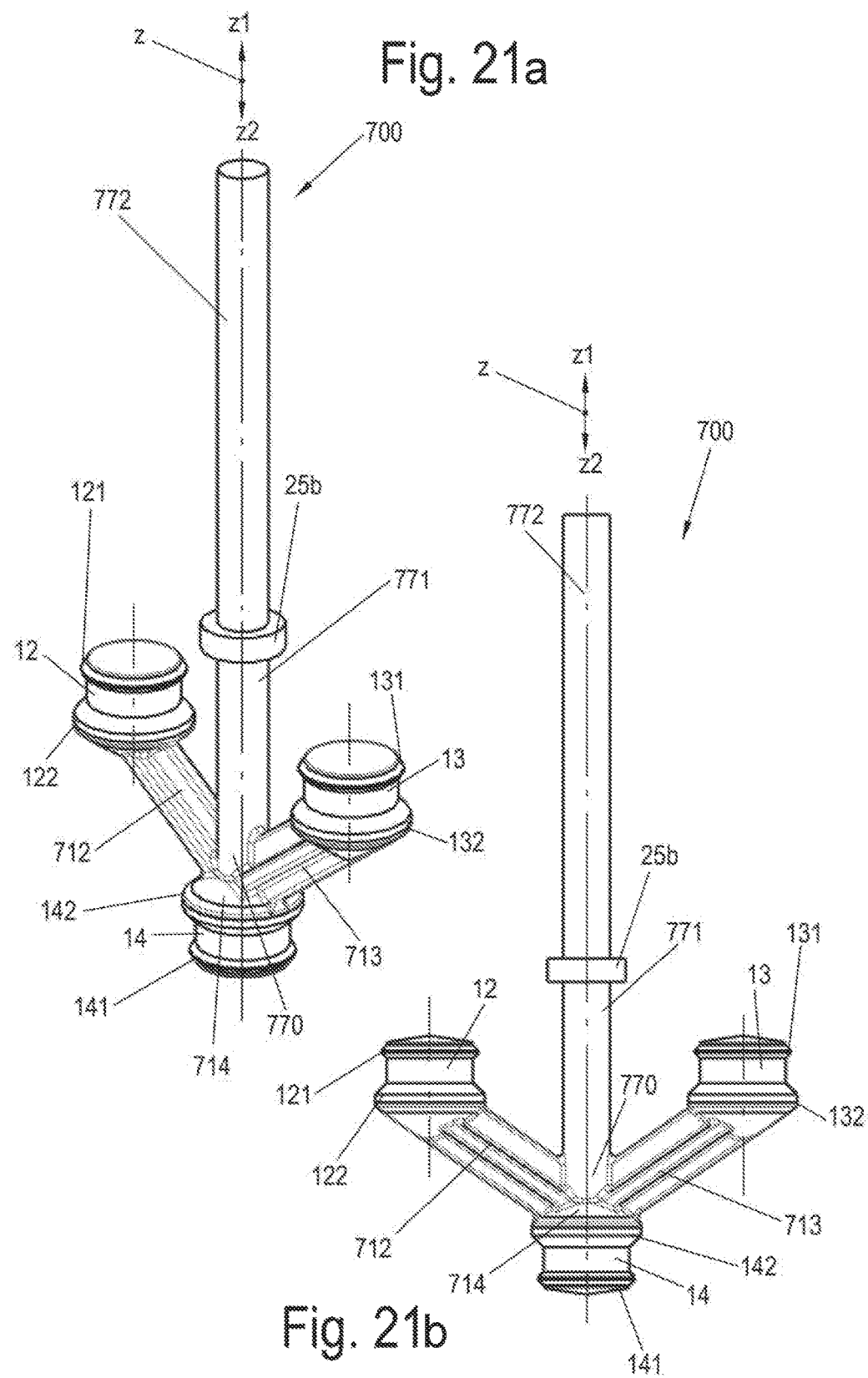
FIG. 21a through 21b show schematic views of an actuator of the third exemplary embodiment of the safety valve device according to the invention as per FIG. 14.

FIGS. 21a and 21b show schematic views of the common actuator 700 of the third exemplary embodiment of the safety valve device 11 according to the invention as per FIG. 14.

In the perspective view of the common actuator 700 in FIG. 21a, it can be seen here that the actuation arms 712 and 713 protrude laterally and upward at an angle from the actuation body 770, wherein the actuation body 770 merges, in the upward direction, into the first actuation element 771, and in the downward direction, into the very short actuation arm 714. The actuation body 770, the first actuation element 771, and the actuation arms 712, 713, 714 are in this case formed in one piece, for example as a plastics injection-molded part composed of a food-safe plastic. It is self-evidently also possible for use to be made of a metal material, in particular a food-safe high-grade steel. The parts 770, 771, 712, 713, 714 are then welded to one another.

The side view in FIG. 21b shows, by way of example, weld seams between the above-mentioned metal parts and stiffening webs on the sides of the actuation arms 712, 713.

Figure 22:
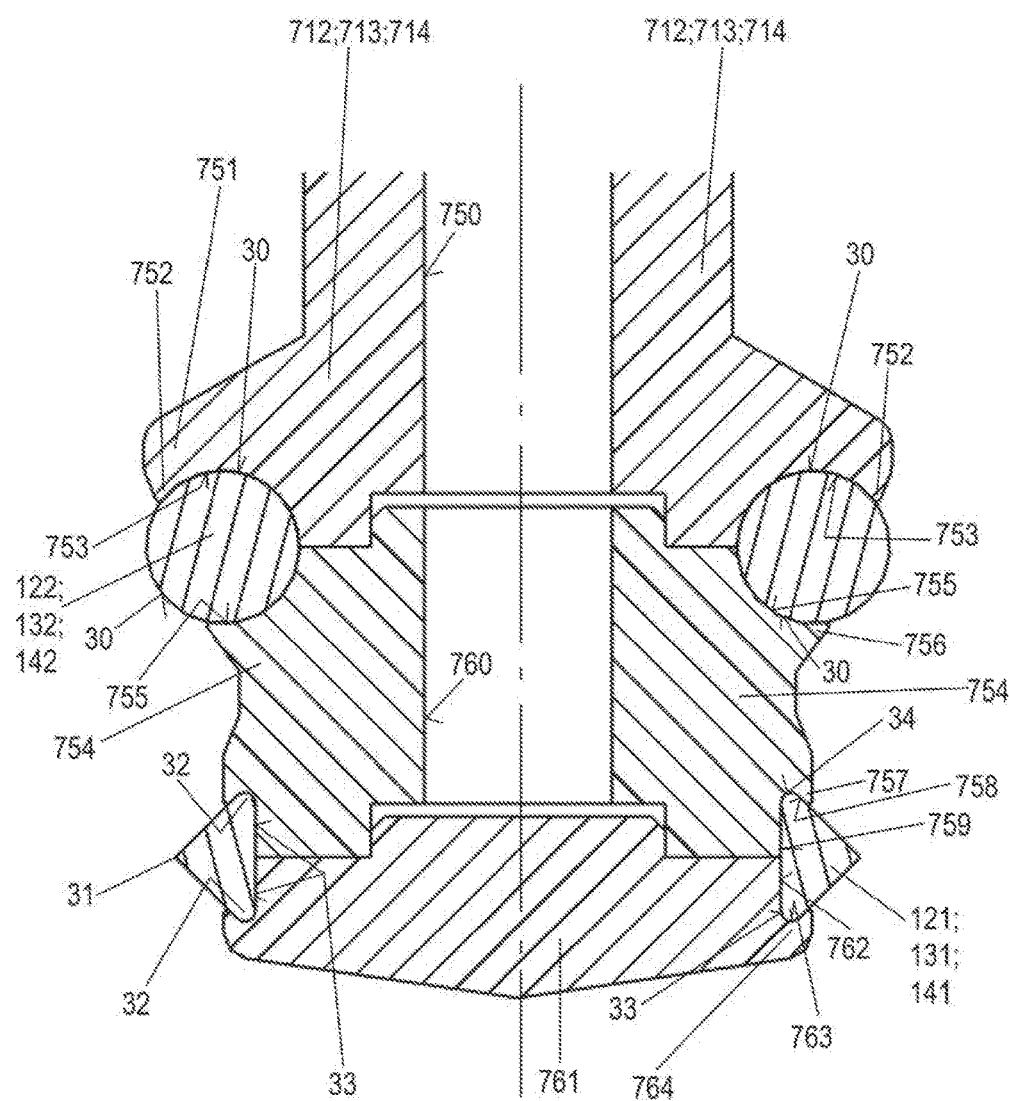
FIG. 22 shows a schematic sectional view of a valve element of the third exemplary embodiment of the safety valve device according to the invention as per FIG. 14.

FIG. 22 illustrates a schematic sectional view of a valve element 12, 13, 14 of the third exemplary embodiment of the safety valve device 11 according to the invention as per FIG. 14.

Each valve element 12, 13, 14 has a secondary sealing element 121, 131, 141, a main sealing element 122, 132, 142, an intermediate element 754, and a retaining element 761. The main sealing element 122, 132, 142 is arranged between the end of the respective actuation arm 712, 713, 714 of the actuator 700 and the intermediate element 754. The secondary sealing element 121, 131, 141 is mounted between the intermediate element 754 and the retaining element 761. The end of the respective actuation arm 712, 713, 714 of the actuator 700, the intermediate element 754 and the retaining element 761 are connected to one another. In the case of a plastic, for example PPSU, the parts are connected to one another by means of an ultrasound welding process. In the case of metal or combinations, other connection techniques are self-evidently also possible. The respective actuation arm 712, 713, 714 may have a cavity 750. The intermediate element 754 may also have a cavity 760. The cavities 750 and 760 are arranged centrally with respect to one another and may, for example for connection and/or stiffening purposes, be provided for receiving a connecting element, for example a cylindrical part, which is not shown.

That side of the respective actuation arm 712, 713, 714 of the actuator 700 which points towards the respective intermediate element 754 is of conical form with a seal portion 751, the outer diameter of which increases toward the intermediate element 754. For receiving the main sealing element 122, 132, 142, there is formed into the seal portion 751 a recess 753 which has an encircling edge 752. The recess 753 corresponds to the shape of the respective main sealing element 122, 132, 142 and, in this case, is formed with a radius. Between the end of the respective actuation arm 712, 713, 714 and the side, connected thereto, of the intermediate element 754, and between the other side of the intermediate element 754 and the side, connected thereto, of the retaining element 761, there is provided in each case one centering means (shaft shoulder, receiving bore) for the components, the centering means not being shown in any more detail.

That end of the intermediate element 754 which points towards the end of the respective actuation arm 712, 713, 714 is provided with a recess 755 which also corresponds to the shape of the respective main sealing element 122, 132, 142 and which in this case, like the recess 753, is provided with a radius. The recess 755 is formed, like the recess 753, with an encircling edge 756.

The two recesses 753 and 755 serve to receive the main sealing element 122, 132, 142, which in this case is in the form of a round cord seal (O-ring) with a circular cross section and a seal surface 30. The edge 752 of the end of the respective actuation arm 712, 713, 714 and the edge 756 of the intermediate element 754 are designed so as to extend beyond the central point of the circular cross section of the main sealing element 122, 132, 142 and thereby fix and captively hold the latter when the respective valve element 12, 13, 14 is in the assembled state. That is to say, a cross-sectional area of the two recesses 753 and 755 which are situated together in the assembled state (as shown in FIG. 22) form a circle segment whose central angle is greater than 180°, in this case for example approximately 228°. Thus, a part of the cross-sectional area of the respective main sealing element 122, 132, 142 is surrounded with a form fit by the recesses 753 and 755.

The respective secondary sealing element 121, 131, 141 is arranged at the connection side between the intermediate element 754 and the retaining element 761. The secondary sealing element is received on the intermediate element 754 and on the retaining element 761 by mutually opposite encircling recesses 758, 759, 762 and 763. Here, the recesses 758 and 763 and in each case one encircling edge 757 of the intermediate element 754 and one encircling edge 764 of the retaining element 761 surround a part of the cross section of the respective secondary sealing element 121, 131, 141 with a form fit. The recesses 758 and 763 correspond to the outer contour, which they surround with a form fit, of edge surfaces 34 of the respective secondary sealing element 121, 131, 141, which in this case has a triangular cross section with a sealing lip 31, rounded seal edges 32 and a base side with a seal abutment 33. The ends of the base side form the rounded seal edges 32 and are connected in each case via one side to the sealing lip 31, which is situated opposite the base side. In the example shown here, an angle of the sealing lip 31 between the sides is approximately 90°.

That part of the cross section of the respective secondary sealing element 121, 131, 141 which is surrounded by the recesses 758 and 763 with a form fit is formed by the base side with the seal abutment 33, by the rounded seal edges 32 and by approximately in each case one quarter of the length of a respective side. In the assembled state, the recesses 759 and 762 correspond to the base side of the triangular cross section of the respective secondary sealing element 121, 131, 141, wherein the recesses 758 and 763 which are connected in each case to the recesses 759 and 762 correspond to the rounded seal edges 32 and the in each case approximately one quarter of the length of a respective side of the triangular cross section of the respective secondary sealing element 121, 131, 141.

In this way, in the assembled state of the respective valve element 12, 13, 14, the secondary sealing element 121, 131, 141 is fixed and captively retained. The retaining element 761 is, at its free end, of conical form with an obtuse angle.

During the assembly of the respective valve element 12, 13, 14, the sealing elements 121, 122; 131, 132; 141, 142 are installed between the corresponding components 712, 713, 714; 754 and 761.

The secondary sealing elements 121, 131, 141 may also be in the form of O-rings or geometric formations on the intermediate element 754 and/or retaining element 761. Two-component injection-molded embodiments are self-evidently also possible.

It is possible for all of the sealing elements 121, 122; 131, 132; 141, 142 or only the secondary sealing elements 121, 131, 141 or only the main sealing elements 122, 132, 142 to be formed from a fluoroelastomer material.

Figure 23:
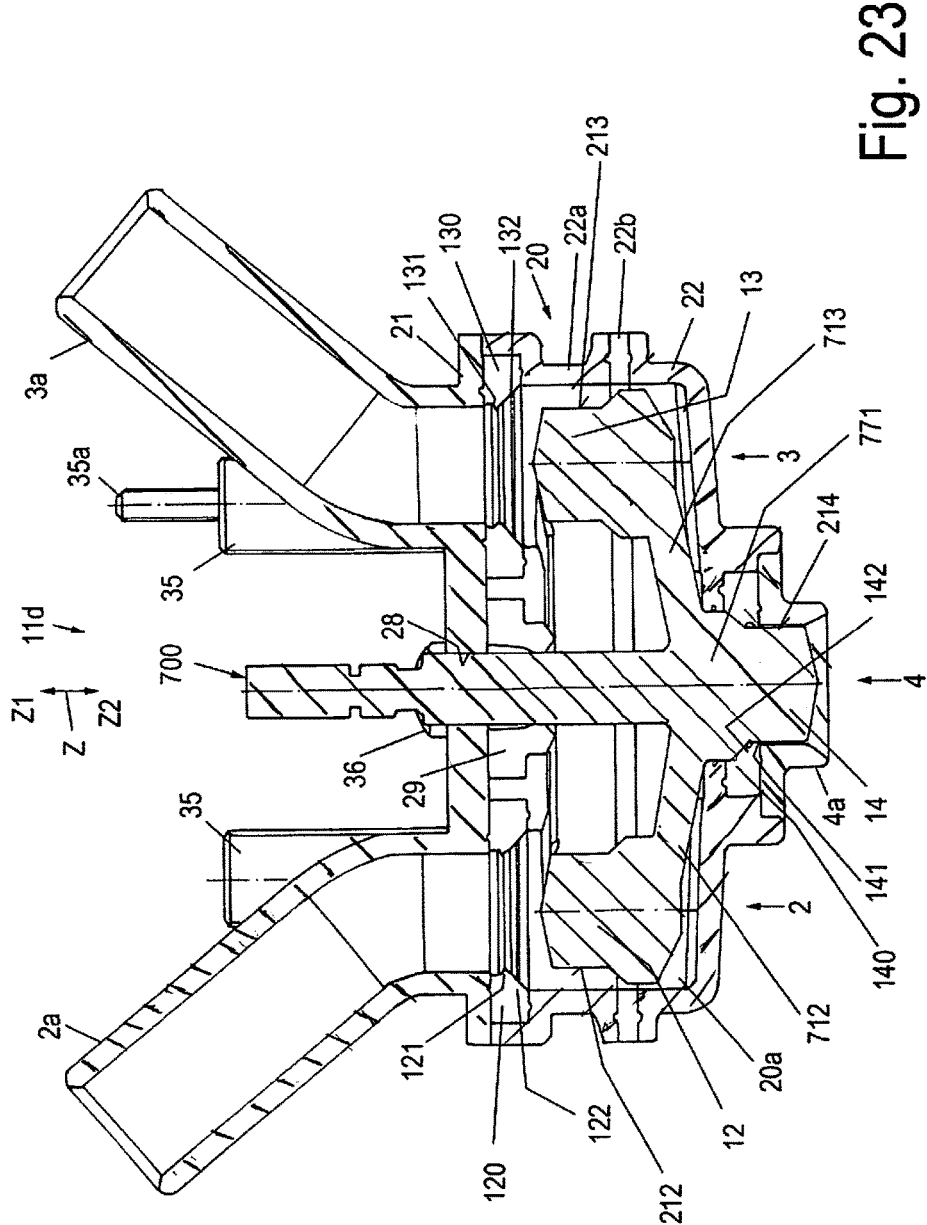
FIG. 23 shows a schematic sectional view of a further variant of the third exemplary embodiment of the safety valve device according to the invention as per FIG. 14.
Figure 24:
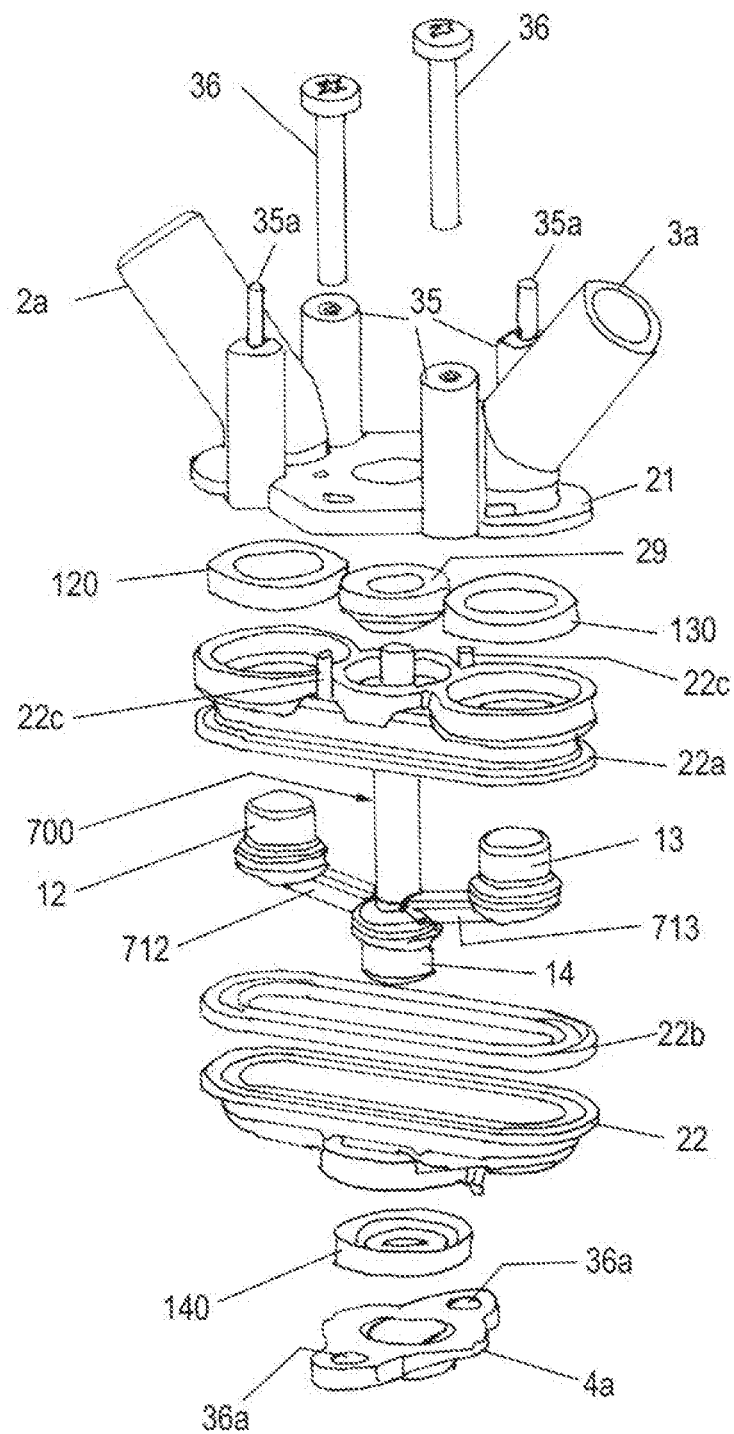
FIG. 24 is a schematic, perspective exploded illustration of components of the further variant as per FIG. 23.

FIG. 23 shows a schematic sectional view of a further variant of the third exemplary embodiment of the safety valve device according to the invention as per FIG. 14. FIG. 24 is a schematic, perspective exploded illustration of components of the further variant as per FIG. 23.

FIG. 23 shows the throughflow position; the other switching positions have already been explained on the basis of the preceding descriptions.

By contrast to the third exemplary embodiment as per FIG. 14, the safety valve device 11d in this variant firstly has the secondary sealing elements 121, 131, 141 and main sealing elements 122, 132, 142 arranged not on the respective valve element 12, 13, 14 but in each case in the valve housing 20. Secondly, instead of separate secondary sealing elements 121, 131, 141 and separate main sealing elements 122, 132, 142, the sealing elements are in this case each formed integrally, as sealing lips or sealing beads, on a common sealing body 120, 130, 140. Here, each valve element 12, 13, 14 has a sealing surface 212, 213, 214 which is in the form of a cylindrical surface and which interacts in each case with the secondary sealing elements 121, 131, 141 and main sealing elements 122, 132, 142 of the sealing bodies 120, 130, 140 in the different switching positions of the safety valve device 11d, as already described above.

A further contrast consists in the construction. The valve housing 20 comprises the in this case upper housing part 21 with the ports 2a and 3a, the in this case lower housing part 22 with the port 14a, an intermediate housing 22a as a seal support and intermediate component, and a housing seal 22b. The housing part 21 also has four fastening domes 35, provided in part with threaded bolts 35a for fastening to a bracket (not shown). The sealing bodies 120 and 130 are inserted into the top side of the seal support 22a, wherein the top side of the seal support 22a is closed by the housing part 21. Here, guide domes 22c of the seal support 22a serve for centering the upper housing part 21, the guide domes for this purpose engaging with corresponding openings in the upper housing part 21. Furthermore, the opening 28 with the bearing 29 for the actuator 700 is formed in the housing part 21, as explained above.

The encircling housing seal 22b is arranged between the bottom side of the seal support 22a and the top side of the lower housing part 22. The third port 4a is mounted, by way of a plate surrounding the latter, on the bottom side of the lower housing part 22, the third port 4a having opposite inserted press-in nuts 36a which interact with in each case one connection screw 36. This entire construction is held together by the connection screws 36, wherein these extend from the top side of the upper housing part 21 through suitable passage openings situated outside the housing interior 20a and are screwed into the press-in nuts 36a. In this way, all of the components of the safety valve device 11d are held together in a fixed manner. The construction is simple to assemble and also to disassemble again.

Figure 25A:
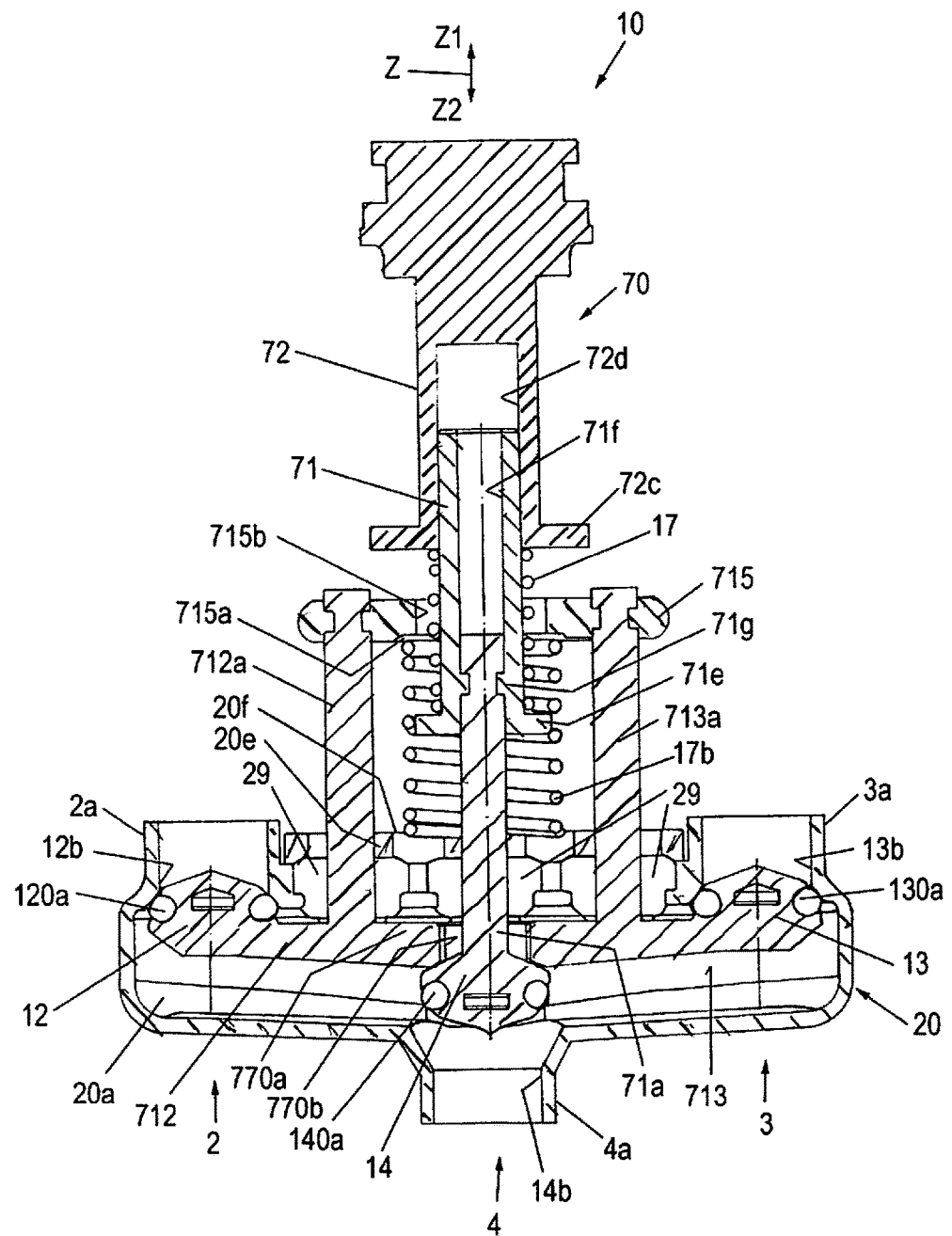
FIG. 25a through 25c show schematic sectional views of a fourth exemplary embodiment of the safety valve device according to the invention as per FIGS. 4 and 5, in different switching positions.
Figure 25B:
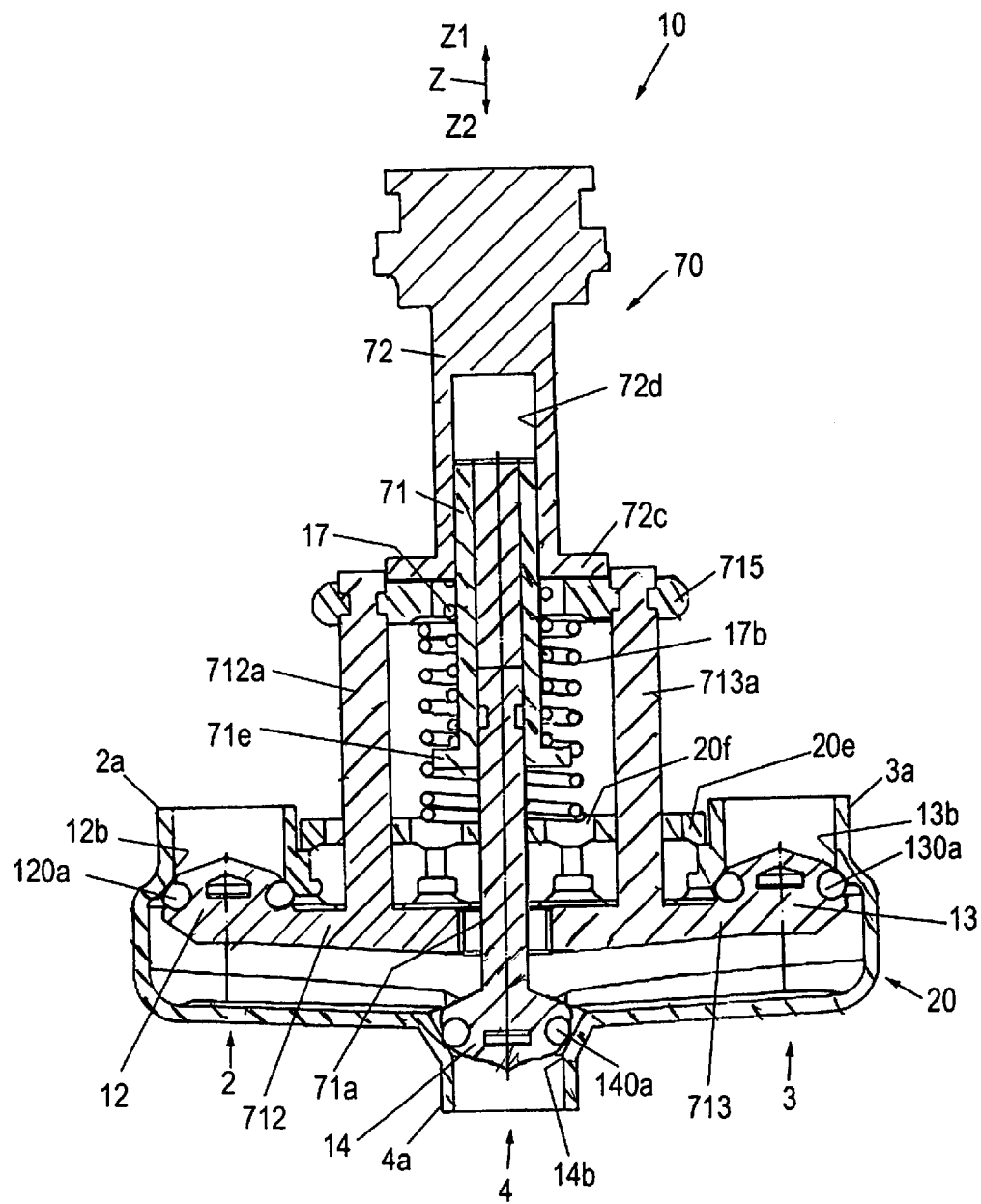
Figure 25C:
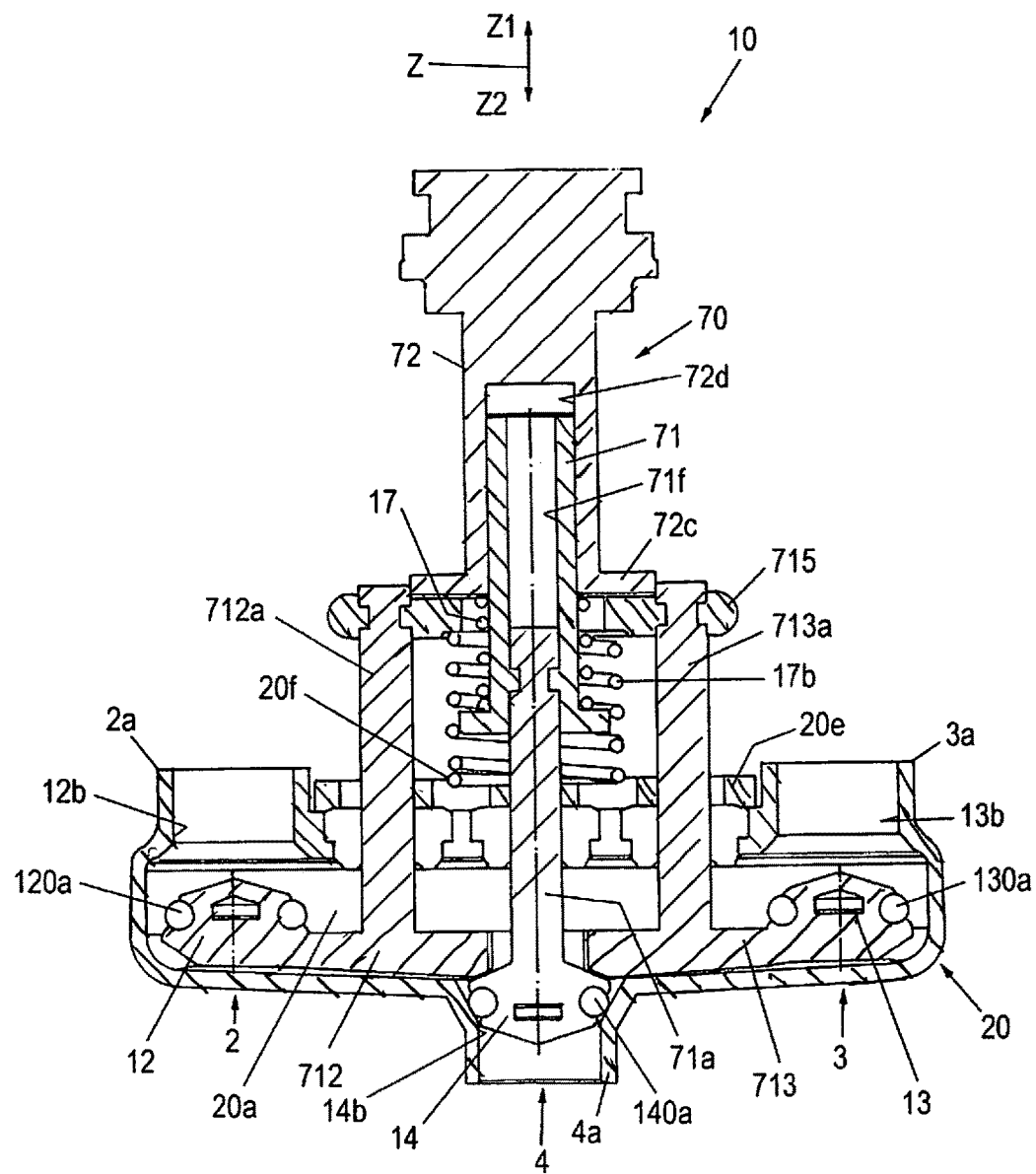

FIGS. 25a-25c show schematic sectional views of a fourth exemplary embodiment of the safety valve device 10a according to the invention as per FIGS. 4 and 5, in different switching positions. Here, FIG. 25a shows the ventilation position of the safety valve device 10a, wherein the ventilation position is simultaneously also the safety position of the safety valve device 10a. FIG. 25b shows the transition position, and FIG. 25c illustrates the throughflow position.

This fourth exemplary embodiment is similar both to the second exemplary embodiment as per FIGS. 10-12 and also to the third exemplary embodiment as per FIGS. 15-17.

The valve housing 20 with the interior 20a has the ports 2a and 3a on the top side, wherein the port 4a is arranged on the bottom side. By contrast to the second exemplary embodiment as per FIGS. 10-12, the valve element 14 of the third valve 4 is also actuated from above, that is to say from the same side as the other valve elements 2 and 3.

The valve elements 12 and 13 are arranged in each case on one end of an actuation arm 712, 713, as in the third exemplary embodiment. By contrast to the third exemplary embodiment, each valve element 12, 13 has an encircling seal body 120a and 130a in the form of a ring with circular cross section. Each seal body 120a, 130a interacts with a sealing seat 12b, 13b of the associated valve 2, 3.

By contrast to the third exemplary embodiment, the actuation arms 712, 713 are connected to one another via a central body 770a which has a central passage opening 770b. Furthermore, each actuation arm 712, 713 is connected, in the first third of its length as viewed from the central body 770a, to an actuation bar 712a, 713a. The actuation bars 712a, 713a extend parallel to one another upward in the z direction, wherein the upper ends of the actuation bars 712a, 713a are connected by means of a horizontal actuation plate 715. The actuation bars 712a, 713a are guided and mounted in the top side of the valve housing 20 in bearings 29 and are sealed off with respect to the valve housing 20 in a way which is not shown in any more detail. Furthermore, on the top side of the valve housing 20, there is arranged a plate 20e which has a spring abutment 20f for an actuator spring 17b.

The actuator spring 17b is arranged with preload ("bias") between the spring abutment 20f and a spring abutment 715a on the bottom side of the actuation plate 715, and presses the actuation plate 715 with the actuation bars 712a, 713a mounted thereon upward, such that in this ventilation position, the valves 2 and 3 are closed, as explained above.

The actuator 70 comprises a first actuation element 71 with a bar-shaped actuation portion 71a and a second actuation element 72.

The third valve 4 interacts with the valve element 14 which, like the other valve elements 2, 3, also has a sealing body 140a which interacts with the sealing seat 14b of the third valve 4. Here, by contrast to the third exemplary embodiment, the valve element 14 is connected to the bar-shaped actuation portion 71a of the actuator 70, wherein the valve element 14 is movable independently of the two other valve elements 12 and 13. The bar-shaped actuation portion 71a extends centrally in the z direction through the passage opening 770b of the central body 770a, further upward through the wall of the valve housing 20, in which the actuation portion 71a is guided in a bearing 29 and sealed off with respect to the valve housing 20, onward through the plate 20e, and concentrically through the actuator spring 17b into the actuation element 71. The first actuation element 71 has an internal receptacle for the upper end of the bar-shaped actuation portion 71a, in which receptacle the actuation portion 71a is connected in an axially locked manner to the first actuation element 71 in a connecting portion 71g. The lower end of the first actuation element 71 is provided with a flange 71e which serves as a spring disk for a valve spring 17.

The valve spring 17 is arranged concentrically around the tubular first actuation element 71 and, with preload ("bias"), between the top side of the flange 71e of the first actuation element 71 and the bottom side of a flange 72c of the actuation element 72. The upper end of the first actuation element 71 is received, so as to be displaceable in the z direction, in a receptacle 72d of the actuation element 72.

In the safety position of the safety valve device 10a shown in FIG. 25b, the second actuation element 72 has been adjusted downward in the z2 direction toward the valve housing 20, such that the flange 72c rests on the top side of the actuation plate 715. Here, the first actuation element 71 with the bar-shaped actuation portion 71a and the valve element 14 have also been adjusted in the z2 direction such that the valve element 14 closes the valve 4. Here, the valve spring 17 exerts a preload ("bias") on the valve element 14.

In the throughflow position of the safety valve device 10a shown in FIG. 25c, the second actuation element 72 has been adjusted further in the z2 direction toward the valve housing 20 such that, now, the actuation plate 715 has also been adjusted in the z2 direction counter to the force of the actuator spring 17b, and via the actuation bars 712a, 713a has also adjusted the valve elements 12 and 13 in the z2 direction such that the valves 2 and 3 are open.

In the reverse actuation sequence, the springs 17b and 17 serve initially for assuming the transition position and then for assuming the ventilation position.

The exemplary embodiments described above do not restrict the invention. The invention may be modified within the scope of the appended claims.

The valves 2, 3, 4 may also be composed in each case of two or more valves connected in parallel or in series.

It is for example conceivable for the valve springs 8, 8-2', 8-3', 8-4', 15, 16, 17 to be composed in each case of two or more springs.

Instead of a valve spring 8, 8-2', 8-3', 8-4', 15, 16, 17, 717, it is also possible to use some other type of force store element with a spring function.

The safety valve arrangement 26 (FIG. 13) is also not restricted to the safety valve devices 10, but may also have other embodiments, for example according to the third exemplary embodiment.

It is also possible for the common actuator 700 of the third exemplary embodiment to be produced in one piece, wherein the common actuator has no separate actuation elements 771 and 772.

Instead of the ends of the respective actuation arms 712, 713, 714 of the actuator 700, it is also possible in the third exemplary embodiment of the safety valve device 11 for corresponding separate receiving parts to be provided. The valve elements 12, 13, 14 may thus initially be manufactured separately and then mounted by way of the receiving parts on the ends of the respective actuation arm 712, 713, 714.

The invention claimed is:

1. A safety valve device for a milking installation for milking milk-producing animals, the safety valve comprising:
   a valve housing defining a milk inlet port, a milk outlet port in fluid communication with the milk inlet port, and a ventilation port in fluid communication with the milk inlet port and the milk outlet port;
   a first valve disposed in the milk inlet port for movement between an open position and a closed position;
   a second valve disposed in the milk outlet port for movement between an open position and a closed position;
   a third valve disposed in the ventilation port for movement between an open position and a closed position; and
   a common actuator disposed at least partially in the valve housing that moves the safety valve device between: a first switching position, in which the first valve and the second valve are closed, and the third valve is open to open the ventilation port; a transition position, in which the first valve, the second valve, and the third valve are closed; and a second switching position, in which the first valve and the second valve are open to open a milk flow path from the milk inlet to the milk outlet and the third valve is closed to close the ventilation line and open the milk line.

2. The safety valve device of claim 1, wherein the first valve, the second valve, and the third valve each include a valve element and a valve seat engaging the valve element when the valve is closed.

3. The safety valve device of claim 1, and further comprising:
   a common valve housing defining a plurality of valve seats, each valve seat corresponding to a respective valve, and
   a plurality of valve elements, and each valve element engages a corresponding valve seat when the valve is closed.

4. The safety valve device of claim 3, wherein the common valve housing has at least two housing parts connected to one another.

5. The safety valve device of claim 1, wherein the common actuator moves through a stroke comprising: a first range to move the safety valve device from the first switching position into the transition position; and a second range to move the safety valve device from the transition position into the second switching position.

6. The safety valve device of claim 1, wherein the common actuator moves through a stroke first range to close the third valve and keep the first valve and the second valve closed, and a second stroke range to open the first valve and the second valve and keep the third valve closed.

7. The safety valve device of claim 1, wherein the common actuator comprises:
   a first actuation portion operatively engaged with the first valve;
   a second actuation portion operatively engaged with the second valve; and
   a third actuation portion operatively engaged with the third valve.

8. The safety valve device of claim 1, and further comprising:
   a common valve housing in which the first valve, the second valve, and the third valve are at least partially disposed and wherein the common actuator is at least partially disposed outside of the common valve housing.

9. The safety valve device of claim 1, and further comprising:
   a frame; and
   an actuator guide joined to the frame to guide the common actuator.

10. The safety valve device of claim 1, and further comprising:
    an actuator spring to bias the common actuator toward the ventilation position;
    a first valve spring to bias the first valve toward a closed position;
    a second valve spring to bias the second valve toward a closed position; and
    a third valve spring to bias the third valve toward an open position.

11. The safety valve device of claim 1, wherein the actuator comprises:
    a first actuation element having a first actuation portion operatively engaged with the first valve and a second actuation portion operatively engaged with the second valve, and
    a second actuation element operatively engaged with the first actuation element, and having a third actuation portion operatively engaged with the third valve.

12. The safety valve device of claim 1, and further comprising:
    at least one sensor device for detecting a switching position of the safety valve device.

13. The safety valve device of claim 1, and further comprising:
    a guide element to guide the common actuator.

14. The safety valve device of claim 1, and further comprising:
    a frame;
    a guide joined to the frame; and
    a guide element joined to the guide, wherein the guide and guide element guide the common actuator.

15. The safety valve device of claim 1, and further comprising:
    a common valve spring operatively engaging the common actuator to bias the safety valve device toward the first switching position.

* * * * *